(12) United States Patent
Lari et al.

(10) Patent No.: US 8,522,205 B2
(45) Date of Patent: Aug. 27, 2013

(54) PACKAGING MULTIPLE GROUPS OF READ-ONLY FILES OF AN APPLICATION'S COMPONENTS INTO MULTIPLE SHARED LIBRARIES

(75) Inventors: Mohammad Shoaib Lari, Palo Alto, CA (US); Rajendra S. Pingte, Foster City, CA (US); Srinath Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2004 days.

(21) Appl. No.: 11/437,899

(22) Filed: May 19, 2006

(65) Prior Publication Data

US 2006/0225072 A1 Oct. 5, 2006

Related U.S. Application Data

(63) Continuation-in-part of application No. 10/848,635, filed on May 18, 2004, now Pat. No. 7,412,700.

(51) Int. Cl.
 *G06F 9/44* (2006.01)
(52) U.S. Cl.
 USPC .......................................................... 717/120
(58) Field of Classification Search
 USPC .......................................................... 717/120
 See application file for complete search history.

(56) References Cited

U.S. PATENT DOCUMENTS

| | | | |
|---|---|---|---|
| 5,388,244 A * | 2/1995 | Brent et al. .................... | 711/208 |
| 5,805,796 A * | 9/1998 | Finch et al. ..................... | 714/40 |
| 5,950,010 A | 9/1999 | Hesse et al. | |
| 6,131,192 A | 10/2000 | Henry | |
| 6,141,698 A * | 10/2000 | Krishnan et al. .............. | 719/331 |
| 6,381,742 B2 | 4/2002 | Forbes et al. | |
| 6,530,080 B2 * | 3/2003 | Fresko et al. .................. | 717/166 |
| 6,718,373 B1 | 4/2004 | Bearden et al. | |
| 7,062,761 B2 * | 6/2006 | Slavin et al. ................... | 717/151 |
| 7,155,710 B2 | 12/2006 | Breckner et al. | |
| 7,185,154 B2 | 2/2007 | Wong et al. | |
| 2001/0047365 A1 * | 11/2001 | Yonaitis ........................ | 707/200 |
| 2002/0002607 A1 * | 1/2002 | Ludovici et al. .............. | 709/223 |
| 2003/0009743 A1 * | 1/2003 | Fresko et al. .................. | 717/117 |
| 2004/0230971 A1 | 11/2004 | Rachman et al. | |

(Continued)

OTHER PUBLICATIONS

U.S. Appl. No. 10/848,635, filed May 18, 2004.

(Continued)

*Primary Examiner* — Mengyao Zhe
(74) *Attorney, Agent, or Firm* — Silicon Valley Patent Group LLP; Omkar Suryadevara

(57) ABSTRACT

Multiple groups of read-only files, for use by various components of an application program in a computer, are packaged as follows. Several executable files are prepared, each executable file corresponding to a group of read-only files used by one or more components. Each executable file includes an array that has sufficient space to accommodate the group of read-only files to be packaged therein. Each array in each executable file is overwritten with data from a corresponding group of read-only files. The presence or absence of each executable file for a group of read-only files is indicated by an index that is developed during initialization of components. Retrieval of data is from the executable files, if the index indicates, on first accessing each read-only file, that the corresponding executable file is present. If the executable file is indicated by the index as being absent, then the read-only file is directly accessed.

28 Claims, 7 Drawing Sheets

(56) References Cited

U.S. PATENT DOCUMENTS

| | | |
|---|---|---|
| 2005/0034120 A1 | 2/2005 | Fisher et al. |
| 2005/0060314 A1 | 3/2005 | Wang et al. |
| 2005/0065953 A1 | 3/2005 | Bower et al. |
| 2005/0169503 A1 | 8/2005 | Howell et al. |
| 2005/0262502 A1 | 11/2005 | Lari et al. |
| 2007/0073913 A1 | 3/2007 | Meyer et al. |

OTHER PUBLICATIONS

Office Action dated Jun. 27, 2007 in U.S. Appl. No. 10/848,635.
Polistchuck, Daniel, "Writing custom data to executable files in Windows and Linux" published Nov. 26, 2001.
Amendment dated Nov. 27, 2007 in U.S. Appl. No. 10/848,635.
Borup, R. "Understanding Windows Installer", Oct. 2003, Great Lakes Great Database Workshop in Milwaukee, Wisconsin, Session 8, pp. 16.
Makemsi (v08.040) "Make MSI based installation files", retrieved from on Feb. 27, 2008, pp. 6.
How to use the Orca database editor to edit Windows Installer, retrieved from http://support.microsoft.com on Feb. 27, 2008, pp. 2.
Notice of Allowance dated Mar. 25, 2008 in U.S. Appl. No. 10/848,635.
Amendment after Notice of Allowance dated Jun. 25, 2008 in U.S. Appl. No. 10/848,635.
Response to Amendment dated Jul. 10, 2008 in U.S. Appl. No. 10/848,635.

* cited by examiner

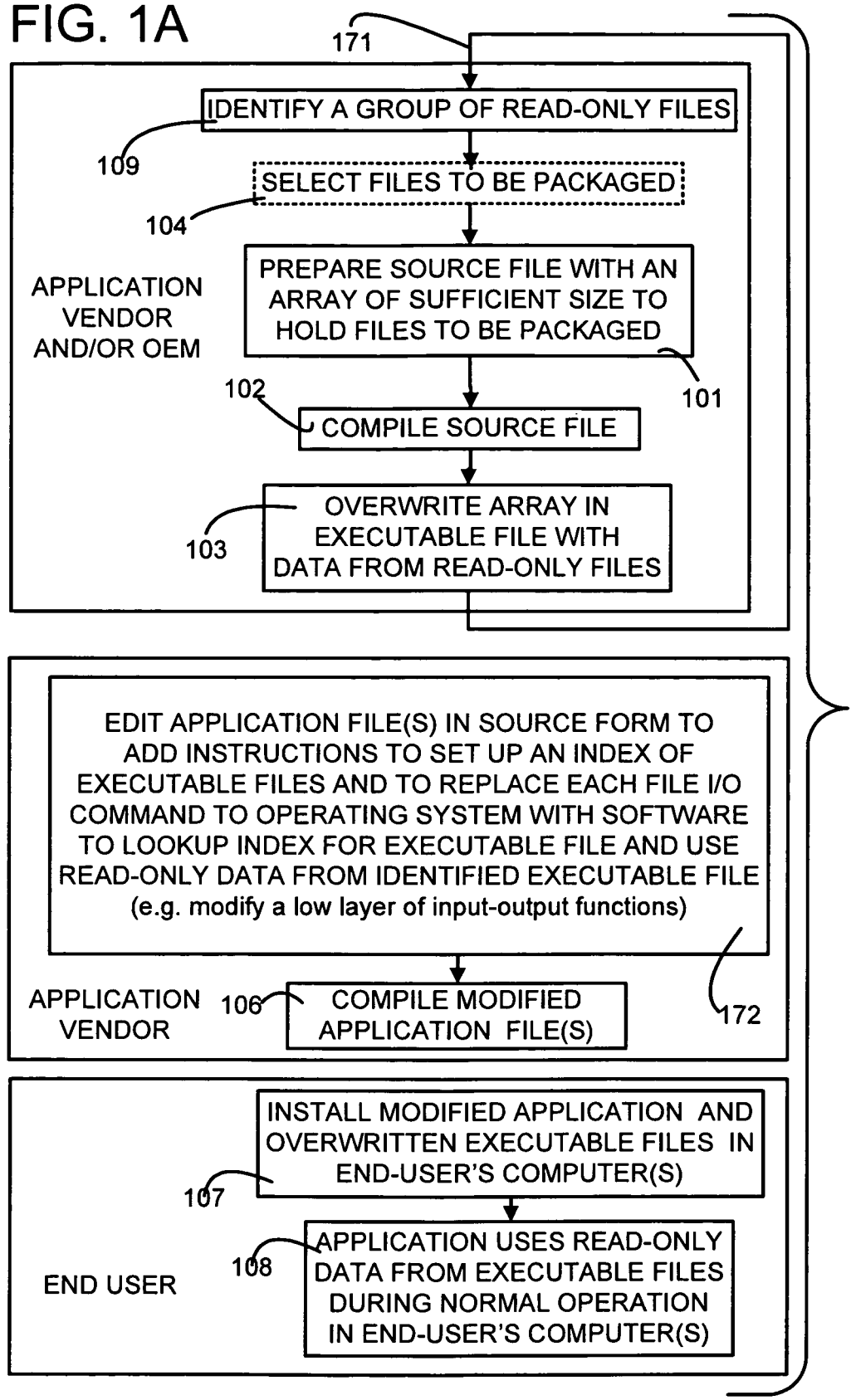

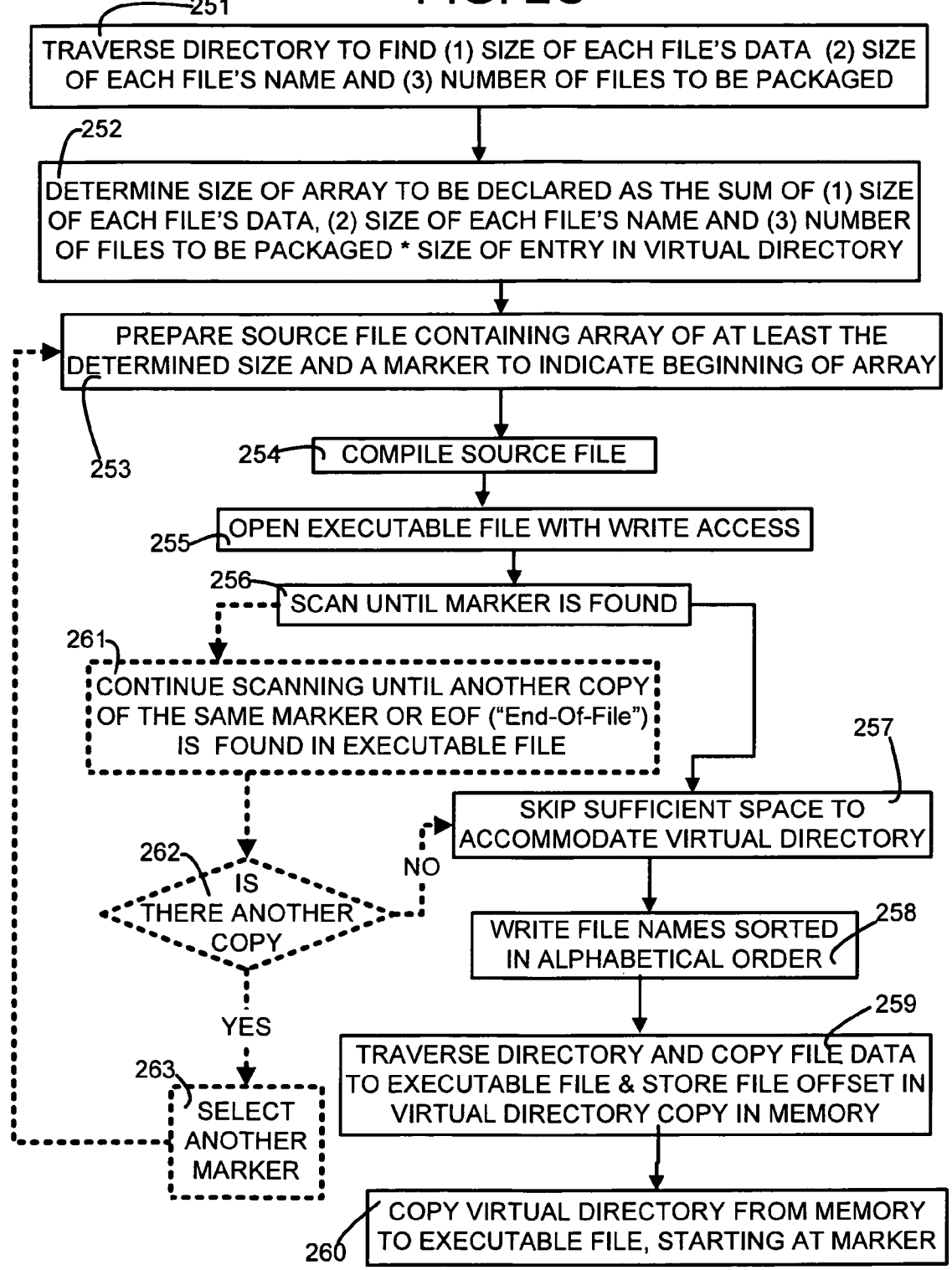

PACKAGING MULTIPLE GROUPS OF READ-ONLY FILES OF AN APPLICATION'S COMPONENTS INTO MULTIPLE SHARED LIBRARIES

This application is a continuation-in-part application of, claims priority from, and incorporates by reference herein in its entirety: U.S. patent application Ser. No. 10/848,635 filed on May 18, 2004 and entitled "PRODUCT PACKAGING AND INSTALLATION MECHANISM" by Mohammad Shoaib Lari et al.

Applicant(s) hereby rescind any disclaimer of claim scope in the parent application (namely U.S. application Ser. No. 10/848,635) or the prosecution history thereof and advise the US Patent and Trademark Office (USPTO) that the claims in this continuation application may be broader than any claim in the parent application. Accordingly, Applicant(s) notify the USPTO of a need to re-visit the disclaimer of claim scope in the parent application, and to further re-visit all prior art cited in the parent application, including but not limited to cited references over which any disclaimer of claim scope was made in the parent application or the prosecution history thereof. See Hakim v. Cannon Avent Group, PLC, 479 F.3d 1313 (Fed. Cir. 2007). Moreover, any disclaimer made in the current application should not be read into or against the parent.

BACKGROUND

Installing a software product, such as tax preparation software (e.g. TurboTax® available from Intuit, Inc.) in a personal computer requires the copying of numerous files in numerous directories. Specifically, when TurboTax® is being installed at C:Program Files\TurboTax, a number of subdirectories (also called "folders") are created. For example, one subdirectory is created for holding the executable "ttax.exe" and related shared libraries, which are files with extension ".dll" such as cdac14ba.dll, clientmesndll.dll and mvmg13n.dll, another subdirectory is created for holding image files, which are files with the extension ".bmp" such as fidelityinvestments_0.bmp and cititrade_0.bmp, and yet another subdirectory is created for holding tax forms, such as fdi02f05.1pe and fdi02ttx.1pe. Although only a handful of subdirectories have been mentioned, there may be an entire tree of such subdirectories which is several levels deep. Moreover, although only a few files have been mentioned above, a typical installation of today's software products requires the set up and copying of 100s of files or even 1000s of files, depending on the software product.

The process of installing a software product containing such a vast number of files in numerous subdirectories (of which the end user has no knowledge) is simplified in today's computers by use of software that is typically called an "installer". The installer not only copies all necessary files from a storage medium (such as one or more CD-ROMs or floppy disks), but also decompresses the files (if necessary). The installer may also update one or more configuration files and/or environment variables which reside in the computer irrespective of the software product being installed.

One prior art installer is described in U.S. Pat. No. 6,131,192 granted to Henry on Oct. 10, 2000 and entitled "Software Installation". According to U.S. Pat. No. 6,131,192 (see column 1, lines 30-56) a single executable file containing the prior art installer may be transferred from a source, such as a website on the Internet, to any disk drive that can be written to and is associated with the computer to which the software product is to be installed. U.S. Pat. No. 6,131,192 also states (see column 1, lines 56-62) that the same single executable file may also contain the source of a tree of files, in addition to the prior art installer (called "shell program" by U.S. Pat. No. 6,131,192).

Such a shell program (or installer) of the prior art may be executed to first install the software in a temporary directory, followed by, among other steps, (a) decompressing one or more individually compressed files in the tree of files, (b) modifying the computer's configuration files, and (c) installing of decompressed files in a target directory (at which the software product is to be permanently installed). U.S. Pat. No. 6,131,192 also describes (see column 3, lines 23-30) an improved installer that contains software materials necessary for the installation of a software product on a computer, and that, once executed, searches for and uses only a small amount of temporary storage space in the process of getting the files of the software product in the target directory, causes the software product to be set up on the computer, and cleans-up the temporary storage space. U.S. Pat. No. 6,131,192 is incorporated by reference herein in its entirety, as background to this invention.

See also U.S. Pat. No. 6,718,373 granted to Bearden, et al. on Apr. 6, 2004 and entitled "Method and system for installing files in a computing system" that is also incorporated by reference herein in its entirety, as background to this invention.

SUMMARY

In accordance with the invention, multiple groups of read-only files are packaged for distribution to end users, by preparing several executable files, each executable file corresponding to a group of read-only files. Each group of read-only files is selected (for packaging into an executable file) based on any criteria, e.g. files that are to be kept together for installation in the end user's computer as a single shared library (also called "package"). Each executable file includes an array that has sufficient space to accommodate the group of read-only files to be packaged into that executable file. After each executable file is created, it's array is overwritten with data from the corresponding group of read-only files thereby to accomplish their packaging. In some embodiments each executable file is first created by compiling a corresponding source file, in which an array of the appropriate size is declared, followed by overwriting of read-only data of the to-be-packaged files into the array's location in the executable file.

Also in accordance with the invention, the multiple executable files are used by a single application program that requires data from the read-only files, as follows. The application program (such as a relational database) is modified with initialization instructions which set up an index indicative of presence or absence of each executable file, in a computer executing the application program. The application program is further modified to use the index whenever a read-only file is first accessed (e.g. via a "file open" function) to identify an executable file (if present) that contains that read-only file's data and to further identify a location within the executable file, of data of the read-only file being accessed. Thereafter, read-only data is accessed from the appropriate location in the executable file (if present). In some embodiments, all executable files containing such read-only data are loaded as shared libraries by the operating system, and automatically shared, e.g. among multiple processes which may belong to same or different components in the application. A component is any portion of the application program that supplies a known functionality of the application program. A component typically has a directory named after it, and the directory is located immediately below a root directory of the application program.

In several embodiments, each component is configurable to use or not use, when accessing its read-only data, an executable file of the type described above, e.g. as a shared library. When any component is configured to not use the executable file, that component stores and retrieves data to/from files in the operating system, in the normal manner of a programmed computer (i.e. using normal file input-output functions in the operating system). When the component is configured to use an executable file for its data, that component is modified as described above, to retrieve read-only data from the executable file. The presence or absence of an executable file for each component is identified in the index.

BRIEF DESCRIPTION OF THE DRAWINGS

FIG. 1A illustrates, in a flow chart, acts performed in accordance with the invention, to create files to be distributed, in the form of an executable file modified by having its array overwritten by data of read-only files being packaged, and one or more application file(s) modified to use read-only data from the overwritten executable file.

FIG. 2C illustrates, in a detailed flow chart, a method used in some embodiments to produce the overwritten executable file of FIG. 2A.

DETAILED DESCRIPTION

Figure 1B:
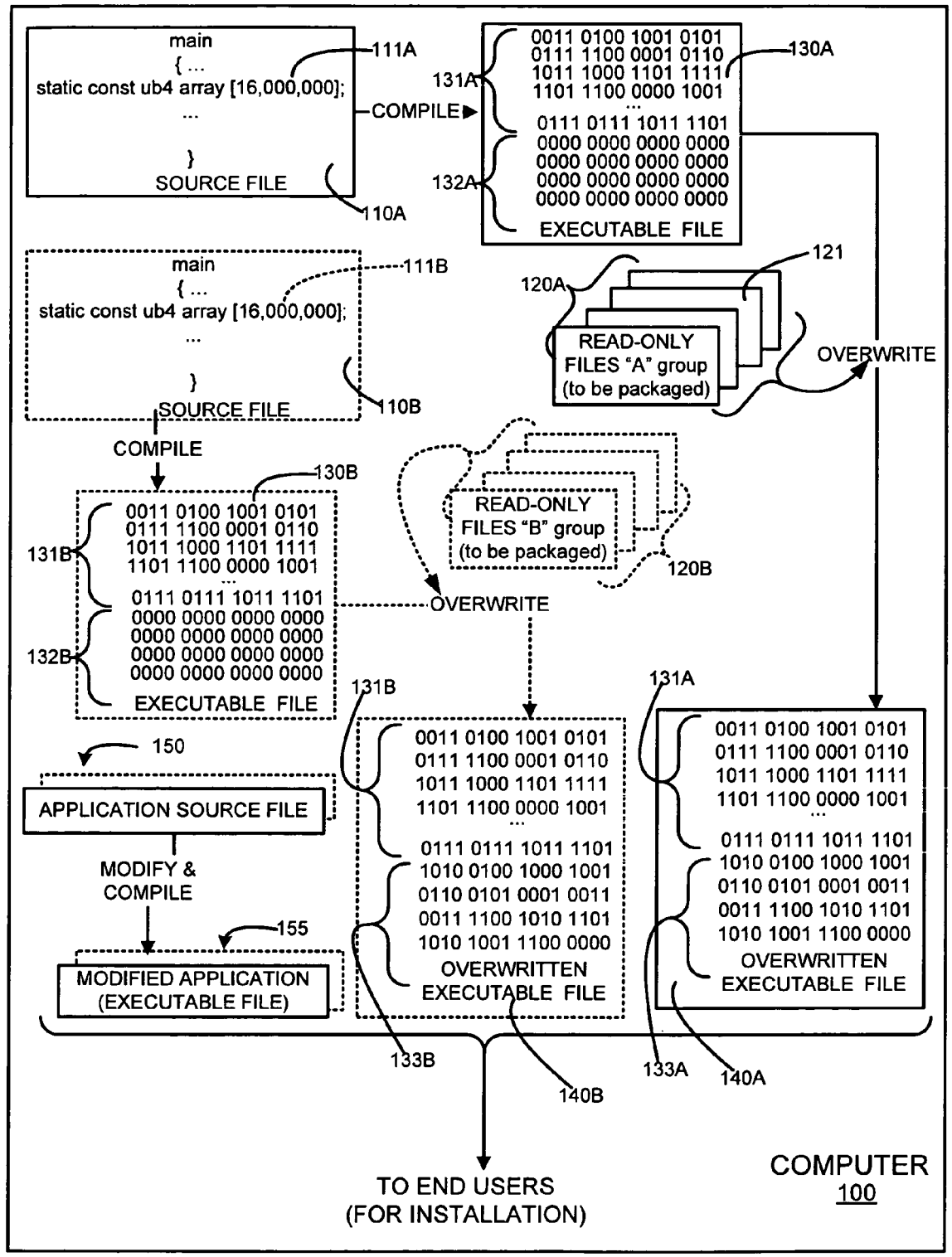
FIG. 1B illustrates, in a high-level block diagram, various files used in the method of FIG. 1A, including two groups of read-only files to be packaged, two source files, two executable files resulting from compiling the two source files, two overwritten executable files resulting from overwriting of arrays with read-only data, application source file(s), and modified application (in executable form) resulting from compilation after replacing of operating system file input-output commands with software to use read-only data from the overwritten executable files.

Acts 101-108 (FIG. 1A) are performed in several embodiments in accordance with the invention, to package a number of files 120A (FIG. 1B) of data that can be shared (e.g. by multiple instances of an application or by multiple applications, which form(s) a software product) into a single executable file 140A (FIG. 1B). In some embodiments, all of acts 101-108 (FIG. 1A) are performed manually. In other embodiments, some acts are preformed manually while other acts are performed automatically. Finally it is also possible for all acts 101-108 to be performed automatically, under manual supervision and/or manual control (e.g. via scripts or commands from humans). In one embodiment, only acts 101-103 are performed automatically, specifically by a software utility (executing in a computer of the type shown in FIG. 3) called "genezi" which is described below in greater detail.

The genezi utility may be used either by a vendor of the application(s) or by an intermediary (such as an Original Equipment Manufacturer (OEM) or by a Value Added Reseller (VAR), or even an information technology (IT) department of a large corporation). The availability of the genezi utility may be limited to only the application vendor in case of some operating systems (such as Windows) but available to such intermediaries in case of other operating systems (such as Unix). Moreover, acts 172 and 106 are performed manually in most embodiments. Also, acts 172 and 106 are performed by the vendor of application(s) in many embodiments. However, in other embodiments, acts 172 and 106 can be performed by an intermediary (of the type described above), e.g. if source code is available to the intermediary. Finally, acts 107-108 are performed manually at an end-user's computer in most embodiments. The end-user may be either a customer of the application vendor or may be an employee of a corporation that employs the intermediary. An example of the application (and product) is the database management system called "ORACLE Database 10 g", available from Oracle Corporation of Redwood Shores, Calif.

The files 120A (FIG. 1B) that may be packaged by performing acts 101-103 are ideally files that are "read-only", such as files containing text and/or graphic information to be displayed to humans, e.g. error messages. Such files 120 are accessed on demand basis, and significant amount of disk I/O takes place for events which are not really error conditions but happen routinely such as in the case of "end-of-data", null, truncation, and other warnings and information only messages. Using a shared library as described below to hold the data of files 120 provides automatic caching of the data by the operating system. A shared library, when referred to by a name that is operating system independent, is also called a "package" in the following description.

Files 120 that are to be packaged into a single executable file of some embodiments are grouped, e.g. depending on whether they are used by a "component", which is one of several components of an application program. Each component typically supplies a well known functionality of the application program. One example of an application program is a database program, such as Oracle database management system. Examples of components in a database program are (1) a command line interface for interpretation of commands input by a database administrator (such as SQL*Plus available from Oracle Corporation), (2) import and export utilities for storing data in and retrieving data from a database (such as IMP and EXP available from Oracle Corporation), (3) a database interface utility which allows access to data in the database from another application program executing in the same computer (such as ODP also available from Oracle Corporation which allows WINDOWS programs to access data in an Oracle database), (4) database management system software (such as relational database management system (RDBMS) software, also available from Oracle Corporation), and (5) Application Programming Interface (API) support for the database (such as Oracle call interface (OCI)) for use in operations on the database such as logon, execute, parse, and fetch.

Read-only files which are specific to each component are traditionally maintained in a subdirectory for each component, under a default directory (such as a directory identified by an environment variable called ORACLE_HOME) for the application program, and each subdirectory is typically identified by that component's name. In the above-described example, directory ORACLE_HOME\ODP holds read-only files used by the ODP component and directory ORACLE_HOME\IMP holds read-only files for the IMP component. As noted elsewhere, some read-only files of a given component are used only by that component, although other read-only files of the component may be used by other components of the application program. Therefore, a component has a high order directory, relative to root directory ORACLE_HOME (e.g. located in the root directory, as a subdirectory therein).

In one illustrative embodiment, data in each top-level ORACLE_HOME directory (or subdirectories thereof) is packaged in only one data shared library. In this embodiment, each top-level directory in ORACLE_HOME is considered a component, and a component's files cannot be split across multiple shared libraries. For example, files having names that match ORACLE_HOME/oracore/mesg/*.msb and ORACLE_HOME/oracore/zoneinfo/*.dat are only packaged in the same shared library because both of these sets of files belong to the same component "oracore". This embodiment does not permit packaging of oracore/mesg files into one shared library and oracore/zoneinfo files into another shared library. In this embodiment, it is possible (and recommended) to package read-only data from several components into a single data shared library. For example, the file called libociei.so for the OCI Instant Client data shared library, contains data from each of: ORACLE_HOME/rdbms/mesg/*.msb, ORACLE_HOME/oracore/mesg/*.msb, ORACLE_HOME/oracore/zoneinfo/*.dat, and ORACLE_HOME/nls/data/*.nlb. Hence the file libociei.so contains data from each of the following components: rdbms, oracore, and nls.

An act 109 (FIG. 1A) is performed in some embodiments of the invention, to identify a group of files 120A for packaging into an executable file, based on a subdirectory in which these files are traditionally maintained, e.g. only the read-only files for a specific component of the application program are identified in some embodiments, by an application vendor or OEM, as the group of files 120 to be packaged. After a group of files 120A identified in act 109, are packaged for a given component, as described below in reference to act 103, these acts are repeated for another component, wherein another group of files 120B are identified in act 109 resulting in another executable file 140B.

Although only two groups of read-only files 120A and 120B and two executable files 140A and 140B are shown in FIG. 1B, note that repeated performance of acts 109, 101, 102 and 103, by looping as shown by branch 171 in FIG. 1A generates any number of executable files, one executable file for each group of read-only files identified in act 109 (i.e. one executable file for each iteration of branch 171). The read-only files identified in act 109 as forming a group to be packaged need not be limited to the files of a single component, and instead an application vendor and/or OEM may choose to identify read-only files of multiple components as a group of files to be packaged, when performing some embodiments of act 109.

Note that files 120A that are to be packaged may be selectively packaged by an intermediary depending on the nature of the end users to whom the shared library is to be released. For example, if the end users of the shared library are Japanese, then the intermediary may select (as per act 104 in FIG. 1A) only files containing information in the Japanese language (e.g. only files containing error messages in the Japanese language) as being the files 120A that are to be packaged. Selection performed in act 104 excludes files containing the same error messages in other languages, such as French, German, Italian, Spanish and Korean.

While language is just one attribute that may be used to limit the files to be included in a shared library, as will be apparent to the skilled artisan, numerous such attributes (e.g. character set such as ASCII or Unicode) may be used by an intermediary to appropriately customize the shared library to the end user. In contrast, an application vendor may include, in a shared library that the vendor creates, a complete set of files for a full installation of the application, as to-be-packaged files 120A, so that the application may be sold to a wide range of end users (e.g. all languages). Note that act 104 is an optional act, and is not performed in some embodiments, although in other embodiments act 104 is performed.

An executable file that is sufficiently large, to hold all such files 120A identified in an act 109 as the group to be packaged, is created in these embodiments, by performing acts 101 and 102 (FIG. 1A). Specifically, in act 101 (FIG. 1A), a source file 110A (FIG. 1B) is prepared (in a high level language, such as the "C" language) to contain therein at least a statement 111A declaring an array (FIG. 1B). The array is declared to have sufficient space to accommodate all files 120A (FIG. 1B) that are to be packaged. The size of the array used in act 101 depends on whether or not act 104 is performed, because act 104 significantly reduces the size of the array to be created in act 101.

The size of the array declared in statement 111A may be determined in some of these embodiments based on the total space occupied by to-be-packaged files 120 on a disk (or other storage media). An array that is larger than the total size of files 120A may be declared in statement 111A depending on the embodiment, to accommodate additional information such as a directory, and/or a listing of the names of all the files and/or a description of the version of each file. However, in certain embodiments such additional information may be stored in a different file in which case an array of size precisely equal to the total size of files 120A may be declared in statement 111A.

Also in some embodiments, the array size may be declared in statement 111A to be larger than the total size of files 120A by a certain percentage (e.g. 10%) or by a fixed amount (e.g. 1 MB) to accommodate future needs in case of growth of data in one or more of files 120A (for example in case a patch is applied). The precise size of the array declared in statement 111A is not a critical aspect of the invention, as long as it is greater than or equal to the total size of files 120A. Note that the size of the array is typically on the order of several MBs, e.g. 10 MB or 65 MB for typical applications being distributed (and installed) in today's world.

Source file 110A (containing an declaration 111A of an appropriately sized array) is then compiled and linked into an executable file 130A (FIG. 1B), e.g. by use of a C compiler and OS linker if the source file 110A contains instructions expressed in the C programming language. Executable file 130A contains an array 132A that may be located after a header 131A that has a specific format depending on the operating system ("OS"). Also depending on the operating system, the instructions of executable code obtained by translation of source file 110A into machine language may be located anywhere relative to header 131A and array 132A or e.g. such code may be located following array 132A or preceding array 132A but following header 131A. Embodiments that are based on Linux operating system use the industry-standard Executable and Linking Format ("ELF") format for executable file 130A, while embodiments based on the WIN- DOWS operating system from MICROSOFT Corporation use the Portable Executable ("PE") standard for file 130A. Although the two formats differ in their inner structures, both formats define a file that is divided into several parts, one of which is the header 131A.

Embodiments that are knowledgeable about a particular operating system's executable file format find the location of array 132A from use of information within header 131A. Embodiments that do not rely on knowledge of the executable file format may use a marker to denote the beginning of array 132A, e.g. by storing a unique bit pattern in the first few bytes of the array as discussed in greater detail in reference to FIG. 2A. Note that in some embodiments, a common marker is used, in all executable files being prepared by a given application vendor and/or OEM, so that multiple components can use the executable files in an identical manner. The just-described two classes of embodiments (OS knowledgeable & without marker or OS agnostic & with marker) have their respective advantages and disadvantages as will be apparent to the skilled artisan (e.g. the latter embodiments need less maintenance).

Regardless of how the location of array 132A is found in the various embodiments, all embodiments determine an offset for the beginning of array 132A relative to the beginning of executable file 130A. This offset is hereinafter referred to as a "base" address of certain space in executable file 130A that is available for storing the data of files 120A, and optionally for storing the above-described additional information (such as a directory). Next, as per act 103 in FIG. 1A, executable file 130 is opened for write access, and array 132A is overwritten with data from each file being packaged ("file data"), thereby to result in file 140A (FIG. 1B).

At this stage, as will be apparent to the skilled artisan in view of this disclosure, overwritten executable file 140A contains the data of numerous files that were otherwise being distributed to end users. As noted above, the files 120A whose read-only data is present in executable file 140A may be selected by performance of act 104, in which case the number of files 120A that are packaged is smaller than if all such files of a component were included. Distribution of a single executable file 140A for one or more components eliminates the need to distribute the numerous read-only files as was done for each prior art component. Therefore, several embodiments distribute just one pair of executable files for each of several components of an application, namely a data file 140A and a code file 155. Data file 140A contains the read-only data needed by the component while code file 155 contains software instructions to be executed by computer 180 to perform functionality of the component. Hence, in many embodiments of the invention, code file 155 has been modified to access its read-only data directly from the above-described array in data file 140A (thereby to eliminate extraction of a read-only file from data file 140A, and installation of each individual read-only file).

Specifically, as illustrated by act 172 in FIG. 1A, application files 150 in source form are edited (manually in most embodiments, although automatic editing can also be done in some alternative embodiments) to replace within each component's each file input-output command that is normally serviced by the operating system with software to access and use one or more files in that component's executable file. Note that in some embodiments, the changes are limited to a low level layer of software in which file input-output instructions are changed. In one such embodiment, the changes to the application are to use a set of functions called "virtual file system" which conditionally use a shared library (e.g. file 140A for component "X" and file 140B for component "Y"; both files are shown in FIG. 1B) on a predetermined library path (as discussed in detail below).

While the applications of some embodiments are programmed to access the files 140A and 140B only conditionally (e.g. after checking that the respective files 140A and 140B exists, and if one of them doesn't exist then defaulting to the operating system), other embodiments use the files 140A and 140B unconditionally (i.e. not rely on the operating system for any of files 120A that have been packaged into file 140A or for any of files 120B that have been packaged into file 140B).

Next, the modified application files (not shown in FIG. 1B) are compiled in the normal manner (as per act 106 in FIG. 1A), resulting in one or more executable files 155 for the modified application(s). Therefore, it is these modified application executable files 155 that are distributed to end users, along with the overwritten executable files 140A and 140B for the respective components X and Y. Note that only one executable file 140A may be distributed to an end user that uses only the corresponding component "X", i.e. executable file 140B need not be supplied to an end user if that end user does not use component "Y".

Figure 1C:
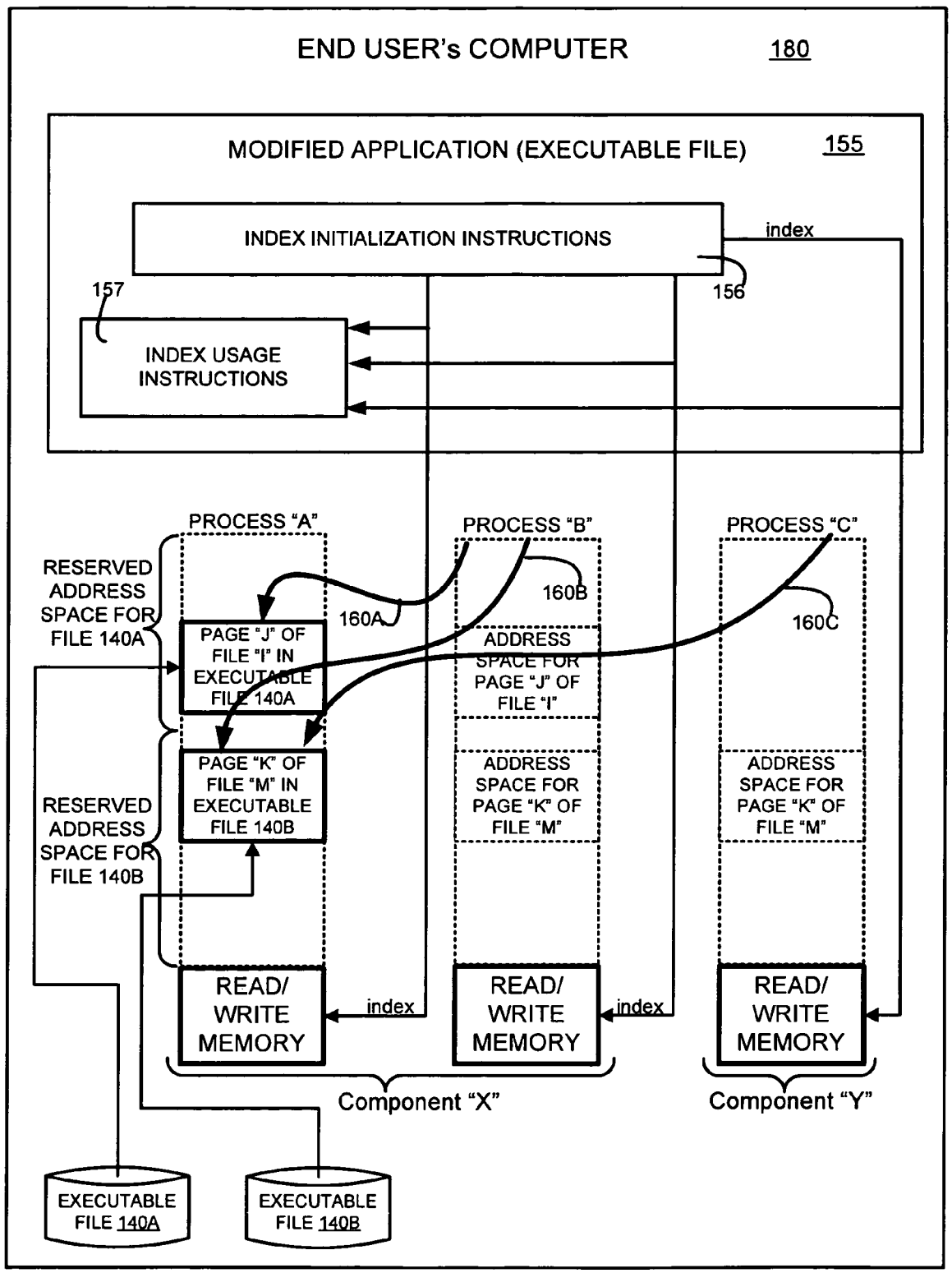
FIG. 1C illustrates, in a memory map, the allocation (and use) of two pages of physical memory to temporarily hold, during run time, a portion of each of two overwritten executable files for access by processes A-C, when these processes access read-only data contained in the pages "J" and "K".

In several embodiments, in act 107 (FIG. 1A) the end user's operating system is instructed to treat the overwritten executable files 140A and 140B of the type described above as shared libraries (e.g. as ".so" files in Solaris) or Dynamic Link Library (e.g. as ".dll" files in WINDOWS). In doing so, the operating system loads the executable files 140A and 140B (FIG. 1B) in a shareable manner as illustrated in FIG. 1C. Specifically, although any given executable file 140A or 140B (FIG. 1B) may be fairly large (e.g. 65 MB in size), that particular file is not loaded into physical memory in its entirety when a process "A" of application 155A (FIG. 1B) executes. Instead, a process "A" of a component "X" reserves address space of the size of the executable files it will access, such as files 140A and 140B (in preparation for addressing the file data located herein), but only one or more pages of files 140A and 140B are loaded by the operating system into physical memory as and when needed. For this reason, in FIG. 1C, only a single page "J" of file 140A and only a single page "K" of file 140B are shown loaded in memory and in use by process "A" of component X.

In many embodiments of the invention, application files 155 (FIG. 1C) contain a low level layer of software which in turn contains initialization instructions 156 to set up an index for one or more executable files 140A-140C that may be present in the computer 180 in which the application program executes. The index is created when each of processes "A"-"C" executes initialization instructions 156 which set up the index in a read/write memory of the respective processes. In several embodiments, each process "A," "B" and "C" has its own copy of the index in its own private read-write memory. Indices are created for each process on an as-needed basis in these embodiments. Hence, if process A uses component X then it only has a copy of the index for X. It is the usage of an index by a process that determines the creation of the index for that process. However, in an alternative embodiment, a common index is used in all the processes, and this common index has the same size and the same entries in each process, regardless of component.

The index identifies, for example, the name of the component to which a current process belongs, a name of a corresponding executable file, and whether or not the executable file is present in computer 180. An illustrative example of entries in such an index are provided in the following table, with the status indicator flag value of "1" indicates shared library mode indicating presence of the executable file whereas "0" indicates default mode using read-only files in the normal manner.

| COMPONENT NAME | EXECUTABLE FILE NAME | STATUS INDICATOR FLAG |
|---|---|---|
| "RDBMS" | "libociei.so" | 1 |
| "SQL*Plus" | "libsqlplusic.so" | 1 |
| "OCI" | "libociei.so" | 1 |
| "IMP" | "libimpic.so" | 1 |
| "ODP" | "libodpic.so" | 1 |
| "EXP" | "" | 0 |

Note that in the above table, all components use executable files for their read-only data except for the component "EXP" which accesses individual read-only files in the normal manner. In some embodiments, a component provides a command line or graphical user interface to display its operating status indicator flag (which has the values "default mode" and "shared library mode").

In some embodiments, initialization instructions 156 use a predefined syntax to convert each component's name into the corresponding executable file's name (e.g. by adding "lib" before the component's name and by adding ".dll" or ".so" after the component's name). Initialization instructions 156 further check for the presence or absence of executable files needed by the current process, in a predetermined path, such as the default directory for the application (e.g. the logical name ORACLE_HOME) and record the result of checking in the index.

Depending on the embodiment, the index may be implemented in the memory of computer 180 in any manner, such as a hash-table, or alternatively as a linked list, as illustrated in Appendix C below. For a small number of components and packages a linked list approach is faster because the hash tables have overhead of computing the hash function and organizing buckets etc. However, for a large number of components and packages, the link list approach becomes costly especially for components or packages stored at the end of the list. For a fixed number of components for packages, an array can also be used. This will cost more memory and will not be extensible beyond the array size, but it will be the fastest approach. Further depending on the embodiment, the index may be held in volatile or non-volatile memory, and accessed by a predetermined data structure and/or predetermined software (of the type required for a hash table or a linked list). Also depending on the embodiment, the index may or may not be maintained in a global memory (e.g. SGA memory or PGA memory in case of the Oracle database) that is available to all components in the application. When read-only data is first needed (from a corresponding read-only file), each process executes instructions 157 to first use the predetermined data structure to access the index to find out whether or not the corresponding executable file is present for the read-only data being sought, and thereafter executes accordingly.

When another process "B" of component X that also uses files 140A and 140B is executed, this process "B" also reserves address space of the size of files 140A and 140B. If process "B" needs the same read-only data as process "A" (or read-only data from the same pages "J" and "K"), then the operating system does not load additional copies of pages "J" and "K" into the physical memory for use by process B. Instead, the operating system automatically translates the virtual addresses in process B to physical addresses which access the physical memory appropriately (as shown by arrows 160A and 160B in FIG. 1C) to enable process "B" to directly access pages "J" and "K" that are already in memory. Therefore, instructing the operating system to treat files 140A and 140B as shared libraries (as per act 107 in FIG. 1A) uses less memory than if each process were to receive its own copy of files 140A and 140B in physical memory.

In the example illustrated in FIG. 1C, executable file 140B holds the read-only data for component Y whereas executable file 140A holds the read-only data for component X. Note that component X uses not only its own read-only data but also uses component Y's read-only data. For this reason, process A of component X has been shown in FIG. 1C as having accessed and loaded into memory the two pages J and K from the two files 140A and 140B. At this stage, if a process C of component Y needs the read-only data in page "K" of file 140B, and as this page is already loaded into physical memory by process "A" as a shared library, the operating system automatically translates (as shown by arrow 160C) the virtual addresses in process C to physical addresses which access the read-only data from page "K" in physical memory. For example, if component X is SQL*Plus then it loads not only it's own executable file but also the executable file of another component Y, namely OCI and so when an OCI process "C" is started it simply uses the read-only data loaded into memory by the SQL*Plus process "A".

Therefore, when files 140A-40C are installed as shared libraries, multiple instances of an application (or multiple applications) efficiently use (as per act 108 in FIG. 1A) a single copy of each file (or a portion thereof) which is in physical memory. Note, however, that in other embodiments of act 107, one or more of executable files 140A-140C may be installed as non-shareable files. And in still other embodiments, instead of an executable file, a data file is used (to hold read-only data of multiple read-only files) via memory mapping I/O (in an alternative act 107) to support a virtual directory as discussed in the next paragraph, in which case the above-described acts of preparing a source file (as per act 101 in FIG. 1A) and compiling the source file (as per act 102) are avoided.

An alternative embodiment in accordance with the invention creates a data file containing read-only information from to-be-packaged files 120A, in the normal format of a binary file, and the data file is used directly via memory mapping functions of the operating system in the end user's computer. Note that in this alternative embodiment, the data file is created instead of creating an executable file 130A (or overwritten file 140A) and for this reason the data file does not have header 131A, for example. Since the data file of this embodiment contains read-only data, so this data file is mapped by the application in a share-able manner, such as using the MAP_SHARED flag on Unix. A virtual directory also included in the data file of this embodiment provides information about the memory region where each of packaged files 120A is mapped (offset and size), and the memory mapping function of the operating system (such as mmap on Unix) returns a memory pointer to the data of each individual read-only file 121 after the mapping is done. The Unix mmap( ) function allows access to resources using address space manipulations instead of the read/write interface.

Once a file is mapped by mmap( ), all a process has to do to access the file is simply use data at the address to which the file is mapped. In this embodiment, a virtual file system is implemented with a read function (e.g. lfvread) that simply copies data from the location of a given file 121 (which is a memory location) to the end user's buffer just as it does in embodiments that use overwritten executable file 140A. When a file 121 is closed by the application, the alternative embodiment's virtual file system implements a close function, to unmap the address space of the specific file 121 that is being closed, by using the operating system's memory unmap function (such as munmap on Unix).

Another embodiment also does not use a compiler/linker, but does in fact create an operating system specific executable file (e.g. the ELF-format or PE-format file as described above). In this embodiment, an application is knowledgeable about the executable format of the end user's operating system and uses this format to directly generate file 130A (FIG. 1B), for example by opening a file for write access followed by writing of header 131A followed by writing of a blank array, with array size determined from the total size of files 120A as noted above. File 130A may be directly generated in this manner, either as an object file or as an executable file, depending on the implementation.

As noted above, in this embodiment, when generating executable file 130A directly, a compiler/linker is not used (because a source file is not even created). Thereafter, data from files 120A is used to overwrite executable file 130A in a location therein where the array is present, resulting in overwritten executable file 140A. During overwriting, the array's location as known from knowledge of the executable file's format may be used in some implementations although other implementations may use a marker as described above.

Yet another embodiment directly generates an executable file 140A that already contains the information from files 120A, without generating file 130A. Specifically, this embodiment uses the known file format to insert all the necessary information for header 131A followed by insertion of information from files 120A at the location where the array would have been located, followed by any necessary information at the end of file 140A (such end-of-file information (e.g. a checksum) may or may not be present, depending on the individual file format).

Figure 2A:
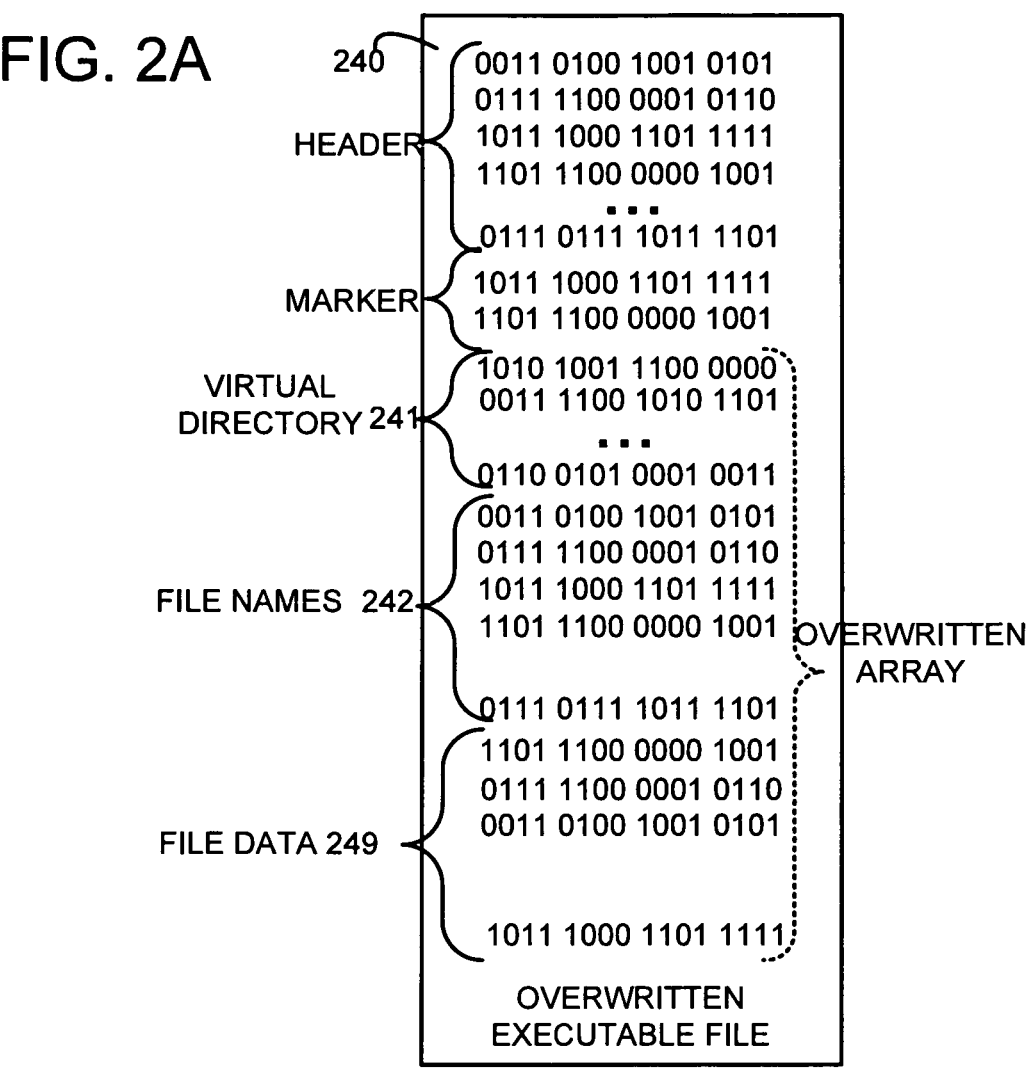
FIG. 2A illustrates, in detail, the structure of an overwritten executable file in some embodiments of the invention.
Figure 2B:
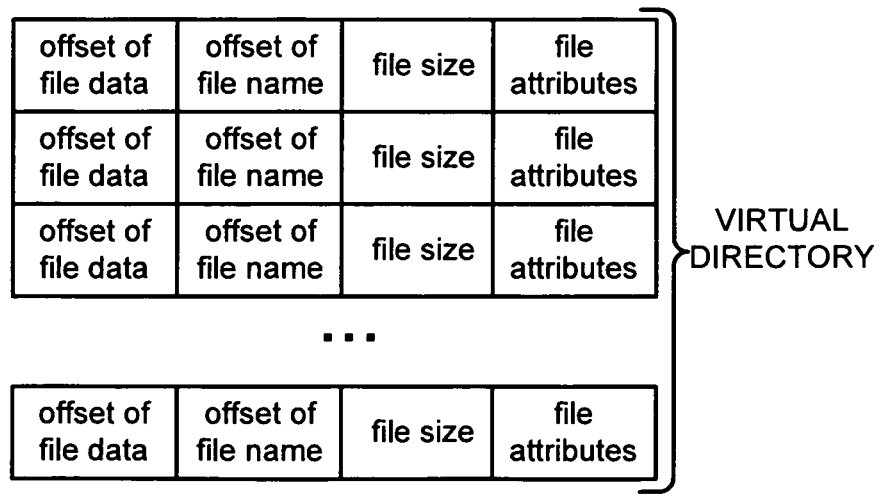
FIG. 2B illustrates, in detail, the structure of a directory (called "virtual directory") that is included in the overwritten executable file of FIG. 2A.

Although several embodiments have been described above in reference to FIGS. 1A-1C, one exemplary embodiment is described below in reference to FIGS. 2A-2C with the understanding that this description is merely illustrative and is not to be used to limit the scope of the invention. Specifically, in the exemplary embodiment of FIG. 2A, an overwritten executable file 240 is prepared in a manner similar to that discussed above for file 140A except for a few differences as noted below. File 240 includes a marker that helps in locating the beginning of the array. Moreover, the array of file 240 is used to store therein not only the file data (of all the files being packaged) but also certain additional information about these files in two additional structures, one structure 241 is called "virtual directory" and is further illustrated in FIG. 2B, while another structure 242 is a list of null terminated character strings of the names of all files.

Virtual directory structure 241 of this exemplary embodiment contains an entry (i.e. record) with four fields for each file stored in overwritten executable file 240: an offset of where each file's data begins in the executable file ("file address"), another offset of where each file's name begins in file list structure 242, the size of each file and file attributes (such as the version number of the file and/or creation date). The just-described offsets are relative to the beginning of the above-described base address of the array in file 240. For example, the file address of the first file in directory 241 is equal to the sum of the size of directory 241 and the size of file names list 242, and the offset of the first file's name is simply the size of directory 241. The size of directory 241 may be calculated as the number of files*(4 bytes*3+128 bytes), assuming there are three fields (two offsets and one size) of size 4 bytes and one field (attributes) of size 128.

In the exemplary embodiment, calculation of the size of the directory depends on the number of files that are to be packaged. Therefore, a directory tree on a disk where the files are currently located is traversed, to accumulate all information necessary to prepare the source file (not shown in FIG. 2A). Specifically, during such traversal, as illustrated by act 251 in FIG. 2C, the size of each file's data is determined (by end-user's computer 180, FIG. 1C) to obtain an estimate of the size of file data 243 (FIG. 2A), and the size of each file's name is also determined to obtain an estimate of the size of file names list 242. As noted above the number of files is also determined, to obtain an estimate of the size of virtual directory structure 241. Thereafter, as per act 252 (FIG. 2C), the size of the array to be declared is determined, as the sum of the size of each file's data, the size of each file's name and the number of files to be packaged*size of an entry in directory structure 241.

In addition, during the tree traversal, the file names are also accumulated, for future use in act 258 (discussed below). Next, as per act 253 (FIG. 2C), the source file is prepared to contain an array of the size that is determined in act 252. The source file of this embodiment is also prepared to include a marker, such as predetermined bit pattern that is, for example 16 bytes long. Next, the source file is compiled (as per act 254) resulting in an executable file that is overwritten as discussed next.

Specifically, as per act 255, the executable file is opened for write access by computer 100 of an application vendor. Next, as per act 256, the executable file is scanned until the marker is found. Then, space in the executable file, sufficient to accommodate the virtual directory (i.e. size of directory 241 calculated as noted above) is skipped, and the names of all files that are to be packaged are written (as per act 258) into the list 242. In this particular embodiment, the file names that were accumulated in act 251 are sorted in alphabetical order and the sorted names are written into list 242, although in other embodiments the file names may be written unsorted.

Also, as per act 259, the above-described directory tree is traversed again although this time the files are read in alphabetical order, and the data in each file is copied into the executable file, starting with the first file's data located immediately after file list 242. After each file is copied, the actual number of bytes that have been copied for the file as well as the offset for beginning of the file data for this file are stored in a data structure in memory that has the same structure as the virtual directory of FIG. 2B (except for being located in memory rather than on disk). Note that the offset for the file name was already inserted in this structure at the time the file names were written into list 242. Next, the offset for the beginning of a next file is calculated, and used in the next iteration for copying the data of the next file. After the data of all files has been copied, the data structure in memory is written to the disk as per act 260 (FIG. 2C), i.e. into the space for virtual directory 241 in the executable file 240.

Executable file 240 that has been overwritten as discussed above is then distributed with the application files to end users for installation in their computers. After installation, the file data in executable file 240 is used by one (or more) application(s) as follows (if the shared library is present): a binary search is performed on virtual directory 241 to find an entry for a file of a given name (e.g. the file name is compared with a file name at the center of directory 241, and if on the left side then the process is repeated on the left side and if on the right side the process is repeated on the right side). Once an entry for the file is found, then the corresponding offset of file data is used as a file pointer (and file data is read sequentially until the file size amount of data has been read).

Figure 2D:
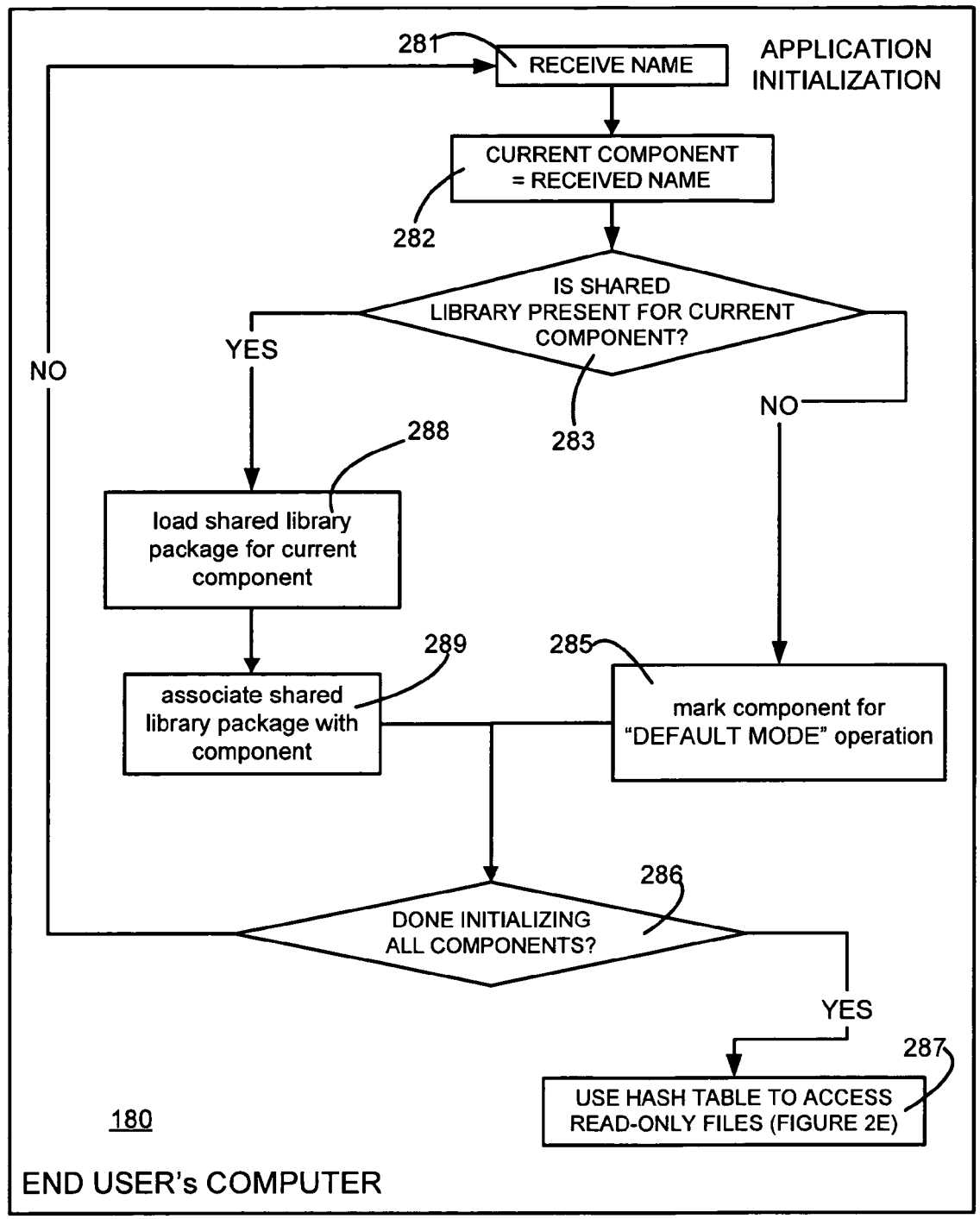
FIGS. 2D and 2E illustrate, in an intermediate level flow chart, acts performed during application initialization and application file I/O respectively.
Figure 2E:
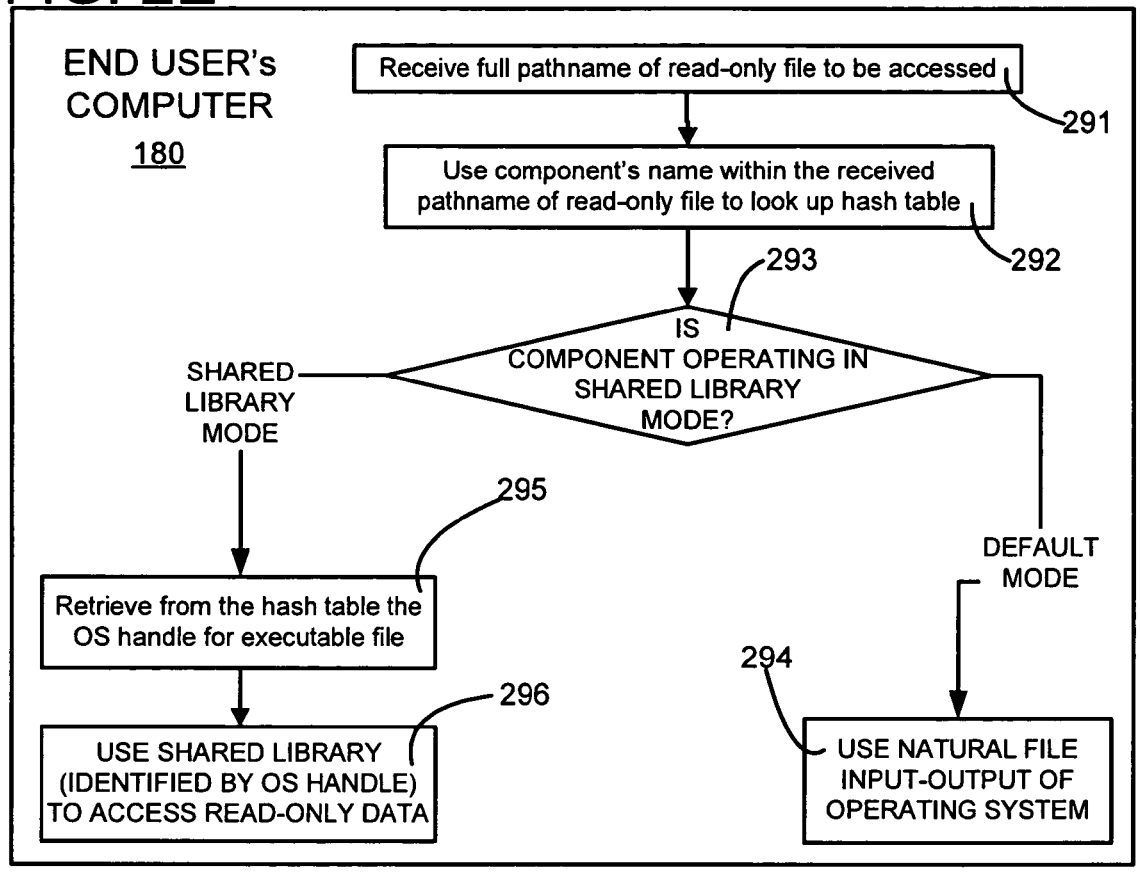

FIGS. 2D and 2E illustrate the initialization and use of a shared library by the virtual file system of one embodiment. Specifically, as illustrated in FIG. 2D, during initialization, one embodiment of computer 180 that has been programmed with application program instructions in file 155 (FIG. 1B). Performs an act 281 to receive the name of the component to which the current process belongs, such as the name IMP or ODP. Next, in an act 282, computer 180 initializes a variable "current component" with the name received in act 281 and goes to act 283.

In act 283, computer 180 checks to see if a shared library with a name for the executable file corresponding to the current component's name (e.g. obtained by use of a predetermined syntax) is present in computer1 80 wherein the application program is executing. For example computer 180 may use the component name "SQL*Plus" to obtain the executable file name "libsqlplusic.so" for use in the Unix operating system as follows. Computer 180 prepends the string "lib" and appends the string "ic.so" to the component name. Next, computer 180 invokes a function "dlopen" of the UNIX operating system. Note that in the WINDOWS operating system, computer 180 prepends "ora" and appends the release number and further appends ".dll" to the component name (e.g. resulting in executable file name orasqlplusic10.dll for the component SQL*Plus).

Depending on the embodiment, act 283 can check (a) the presence of the shared library in a library path of the operating system, or (b) a setting in an environment variable (such as LD_LIBRARY_PATH), or (c) the presence of the library in a directory determined by an environment variable. For example, computer 180 may attempt to load the shared library from a location specified in an environment variable that is identified in the initialization instructions 156 of the application program 150.

If the answer in act 283 is no, computer 180 goes to act 285 and marks the current component for DEFAULT mode operation. Note that when a component operates in the DEFAULT mode, normal file input-output functions in the operating system are used (e.g. normal file I/O is performed). Thereafter, computer 180 goes to act 286 to check if all components in the application have been initialized, and if not returns to act 281 (described above). If all components in the current application have been initialized, computer 180 goes to operation 287 which uses the index to access read-only data from the executable files (for which entries have been made in the index) as described after the following paragraph.

In act 283, if the answer is yes, computer 180 goes to act 288 to initialize the virtual file system in the shared library mode, for the current component e.g. by loading shared library package for current component. Thereafter, the computer 180 goes to act 289 to associate shared library package with component, e.g. by making an entry for the current component in the index, with the status indicator flag set to "SHARED LIBRARY MODE" and the file handle for the executable file of the current component to the value for the file handle returned by the function call to the operating system. Next, computer 180 proceeds to act 286 (described above).

An illustrative implementation of operation 287 (FIG. 2D) is provided in FIG. 2E, wherein computer 180 performs act 291 whenever a read-only file is to be accessed. In act 291, computer 180 receives a full path name of the read-only file, and thereafter goes to act 292. In act 292, computer 180 retrieves the component's name from within the full path name of the read-only file, e.g. by parsing the full path name into its portions, such as the initial portion identifying the default directory and the remaining portion identifying a path relative to the default directory (i.e. a relative path), followed by checking if the environment variable for the current location of the process is same as the relative path, and if so, then extracting the first token from the relative path and using that first token as the component name. Then computer 180 uses the just-retrieved component name to lookup the index (which is a hash table in the embodiment illustrated in FIGS. 2D and 2E). Note that in some embodiments, entries in the index are stored sorted, in lexical order (e.g. based on alpha-numeric codes for characters in path names). The just-described sorting enables binary search of the index at runtime, based on the component name. Next, in act 293, the computer 180 checks to see if the component is operating in the shared library mode, as indicated by a value for status indicator flag received from the index.

If the answer in act 293 is no, computer 180 goes to act 294 to use a normal file input-output function of the operating system, such as "fopen" (i.e. operates in DEFAULT mode). If the answer in act 293 is yes, the computer 180 goes to act 295 to retrieve from the index, the handle in the operating system for the executable file which contains the read-only data that is currently sought. Next, computer 180 goes to act 296 to load into memory (if necessary) and use the executable file in the shared library mode, to access and use the read-only data therein.

Note that although several acts are shown in the attached figures as being performed one after another, there may be any number of acts that occur between such acts. For example, although after performance of act 256, the next act 257 is performed directly thereafter as shown in FIG. 2C, in some embodiments additional acts 261-263 are performed as discussed next. Specifically, in act 261 the executable file 240 is scanned even after the marker is found in act 256 to see if the end of file (EOF) is reached or if another copy of the marker is found (as per act 262). If another copy of the marker is found (which is an unlikely coincidence), then a different marker is selected (as per act 263) followed by preparation of the source file now using this different marker (as per act 253). If in act 262, another copy of the marker is not found, then act 257 is performed in the above-described manner.

In some embodiments, acts 251-263 shown in FIG. 2C are automatically performed in a computer 110 that is programmed with a utility function called "genezi" which is described next (for details, see Appendices A and B which are incorporated by reference herein in their entirety). Specifically, the utility genezi takes as input the list of directories and file extensions to locate all the read-only files of one or more components that are to be packaged into the shared library executable file 240. The utility genezi is executed from a home directory (e.g. as specified in the environment variable ORACLE_HOME), and all the directories in the argument list are with respect to the current directory. For example, to create the ociei.c file, the genezi utility is invoked as:
genezi-create "rdbms/mesg oracore/zoneinfo ocommon/nls/admin/data" "msb nls dat">ociei.c The flag-create means to create the ociei.c source file 110A (described above in reference to FIG. 1B). The first argument is a string containing a space separated list of directories, and the second argument is another string containing a space separated list of file extensions. Please note that the path separator character (such as "/" on Unix) is platform specific.

The utility genezi first determines the list of files by searching the specified directories for any files with the specified extensions. It stores the relative path names and sizes for each file internally. It then adds all file sizes and names plus directory information to come up with the size of the array 249. In computing the sizes, each file size is rounded up and so is a file names array. The file names array is a serial byte array of offsets to all file names (i.e. pointers) where a null terminated string for each file name is stored. Pseudo-code for the create routine in the utility genezi is listed in Appendix A located at the end of this detailed description just before the claims.

Secondly, the source .c file (such as ociei.c) created in the above step is compiled and linked into a shared library such as libociei.so using the C compiler and the native linker of the operating system. Note that the shared library at this stage is "empty" because the large array in the data segment of the library does not have any data in it. As noted below in greater detail, in some embodiments, the text segment of the library has a callback routine that can be called from any module that has loaded the shared library using a loader. Specifically, one embodiment uses a Load Program Module (LPM) which tries to locate and load a shared library based on the name (i.e. package's name). In this embodiment, the package name (such as ociei) gets translated to an operating system specific shared library name (such as libociei.so on Unix or oraociei10.dll on Windows etc.). LPM of this embodiment also exports entry point callbacks from the package so that users of the shared library can call functions in the shared library.

The callback routine described in the previous paragraph takes a filename (relative to a root directory) of a read-only file whose data is being sought, and returns file size and pointer to the beginning of read-only data for that file. As noted above, several embodiments use ORACLE_HOME as the root directory, and all components are installed in this root directory. In these embodiments, all file requests happen with respect to the root directory, i.e. ORACLE_HOME. Hence, the application program prepares all its file I/O requests using the value of the ORACLE_HOME directory as a prefix, to create an full (absolute) path name that is then used to do the file I/O. File open routines (which service the file I/O requests based on use of the executable file in the shared library mode) discard the root directory name, i.e. ORACLE_HOME from the full path name to get the relative path name and search the shared library for the file.

In some embodiments, a root directory name, i.e. ORACLE_HOME is no longer necessary (when all data has been bundled into shared libraries), initialization of the environment variable for the root directory name, i.e. ORACLE_HOME is not required. Hence, when the root directory name i.e. ORACLE_HOME is not set, then the application program internally sets it to a placeholder value such as ".". This way, the file names are still generated using the environment variable, i.e. ORACLE_HOME. In this situation the environment variable ORACLE_HOME is a virtual name, because it is internally set to a temporary name.

In a third step, utility genezi uses the same list of directories and file extensions that were used to create the empty shared library (in the earlier phase). As before, utility genezi must be executed from the home directory (e.g. ORACLE_HOME) and all file names in the argument list are with respect to ORACLE_HOME. For example, to store the files 120 in the empty shared library created in the earlier phase, the utility is invoked as:
genezi-store libociei.so "rdbms/mesg oracore/zoneinfo ocommon/nls/admin/data" "msb nis dat"

The flag-store means to store the data files in the shared library. The first argument is the platform specific filename of the shared library to be operated upon, and the second argument is a string containing a space separated list of directories. The third argument is another string containing a space separated list of file extensions. Please note that the path separator character (such as "/" on Unix) is platform specific.

The utility genezi first locates the marker (e.g. defined OCIEI_PATTERN) within the shared library. Once pattern is uniquely found, the beginning of the array 249 (also called "ocieiFileBuffer" array) is located. The utility genezi then iterates over all the file names specified by the directory and extension lists, and stores them in an internal fnames array. This array is then sorted in alphabetical order so that the callback function (also called "ocieiGetFileBuffer" routine) in the shared library can perform a binary search to locate file records. After the sort, the sorted names array is written into the shared library at the appropriate places in the ocieiFileBuffer array.

The utility genezi then iterates over the sorted names list to read each file and writes its data in the file data area in the ocieiFileBuffer array. The actual number of bytes and its offset in the ocieiFileBuffer is noted in an internal "frecs" records array which contains directory information (FIG. 2B) for all files. After contents of all the files have been written, the frecs record is written in the shared library executable file 240. Pseudo-code for the store routine in the utility genezi is listed in Appendix B located at the end of this detailed description just before the claims.

A virtual file system is implemented in some embodiments, to provide a transparent interface to application(s) that access the read-only files' data in the executable file, in the same manner as if the read-only files were located in a directory and accessed through the operating system (e.g. file open, file seek, file read and file close are implemented on the executable file) as discussed next. Specifically, a low level layer of file input-output functions that is already used by the application is modified, to check for installation of a given component's executable file 240 as a shared library. If the shared library exists, then each file open by a process of the component results in the low level layer making an invocation of a callback function (such as the ocieiGetFileBuffer routine) in the shared library that provides access to file data in executable file 240.

Such a call back function may be located in executable file 240 (FIG. 2A), for example, between the header and the marker, or alternatively after the file data but before the end of file. The callback function returns a pointer to the beginning of the file data of the named file. After that, the low level layer function translates every file read by the application to accessing bytes from the array in file 240. A simulated file pointer is kept in the low level layer for each file thus opened, and the low level layer also checks for reading beyond the available data (e.g. by use of file size as an upper limit on the application's file pointer relative to the file data offset). A simulated EOF is promptly returned by the low level layer when all the data from a file has been read.

Specifically, in one embodiment, the application tries to load the executable file. If the executable file 240 can be successfully loaded, then virtual file system initialization (such as function lfvinit in Appendix C, which appendix is also incorporated by reference herein, and is listed just before the claims) makes an entry in the index to indicate the existence of shared library file 240 to the virtual file system (e.g. sets a status indicator flag in an index implemented as a hash table to the constant LFV_SHL_MODE). The callback descriptor of the function in executable file 240 (also called "ociei package") is passed to the initialization function in the virtual file system (such as the function lfvinit in Appendix C) for usage in calling the package's ocieiGetFileBuffer callback function.

The virtual file system "LFV" (see Appendix C) uses it's own data structures for error handling and returns error codes for error conditions. Examples of error conditions are file not found, or file not accessible due to insufficient privileges etc. The virtual file system LFV generates its own file handles of type lfvf (e.g. see Appendix C). The file handle has a pointer to file data in the shared library and the file size information. A position cursor is maintained in the lfvf file handle, for read and seek operations. Upon completion of read operations, the file handles are closed to free storage allocated for them. The virtual file system "LFV" is read-only.

During operation, if an environment variable called "ORACLE_HOME" is not set, then it is set to ".", i.e. the current directory. This is because file I/O routines in the files 120 generate an absolute filename by prepending ORACLE_HOME to it, so a virtual ORACLE_HOME is necessary. The LFV layer removes the ORACLE_HOME substring from the file path of a specific file 1201 to determine the relative file path. To keep track of the current ORACLE_HOME, the ORACLE_HOME value is also passed to the virtual file system initialization function lfvinit. In this embodiment, the value of ORACLE_HOME has to be passed to the virtual file system LFV, so that the LFV functions can remove it from the path names that they receive on being invoked.

Although in some embodiments an executable file 240 is used to hold data from files, such an executable file can also be used to hold a file 120A of other information, such as information about the version of each file being packaged and/or patches applied to the packaged file(s). This file 120A (which identifies the version of each of the remaining files) is also called "inventory file". This file 120A may be stored in a corresponding executable file that is called "inventory library executable file" (which is different from the executable file 240 containing read-only data of the remaining files 120A).

In preparing the inventory library executable file, the above-described virtual file system is used by creating a ".c" file (for the inventory library executable file), and this .c file contains an array of characters to hold the inventory file 120A. This character array in the inventory library executable file is updated during the build of the shared library executable file 240 to a meaningful version string.

In one particular embodiment, a version banner, e.g. in the form of a 5 digit number, is included in the inventory file. Moreover, in this embodiment a function to get the library's version banner is included in the inventory library executable file, and when invoked, it returns a string representation of the version of shared library executable file 240, which depends on the platform, as follows: 32-bit platform: Client Shared Library 32-bit—10.01.00.02.00 for 32 bit 64-bit platform: Client Shared Library 64-bit—10.01.00.02.00 for 64 bit Moreover, another function similar to the above described function is also included in the inventory library executable file, and this function returns a pointer to a string value of the version as well as any related data stored in the shared library.

One example of storage of related data is storage of the Patch information. Patch information is maintained in some embodiments as follows. First an inventory file (which lists the version of all files being packaged) is generated as follows by use of a utility called "opatch":

opatch lsinventory>opatchinv.out

Specifically, when the Oracle Database 10 g software is installed initially, it creates sub directories countering the binaries and other files required to run the software. As part of the installer an inventory of all software products installed is maintained in a well known directory. A utility to patch the installed software called "opatch" is also installed on the system. When a code defect is found by the customer and he/she cannot function without a fix for it, then Oracle Corporation supplies a one-off patch software to the customer. Note that the customer may be either an end user or an intermediary, depending on the embodiment. The customer installs the one-off patch software on their system through the "opatch" utility. The one-off patch software contains new binaries along with version information to update the existing inventory. Customer then runs the 'opatch' utility on the one-off patch software provided by Oracle Corporation. The utility "opatch" resolves patch conflicts and does version check prior to installing the one-off patch software. Once this check completes successfully it updates the installed software and the inventory file. If for any reason the check fails the patch is not applied and the error is reported. As part of post-processing (i.e. if patch is successfully applied) latest inventory information can then be obtained using the lsinventory option for "opatch" (as shown above), and this information is embedded into the shared library (inventory library executable file) as discussed next.

Next, an archiver utility called "ar" is used as shown below. This "ar" utility (included in, for example, the operating system SunOS 5.6 available from Sun Microsystems, Inc. of Santa Clara, Calif.) maintains groups of files combined into a single archive file. Its main use is to create and update library files. Therefore, the "ar" utility is used to extract an object file (named with the extension ".o") from an archive file called "libclient10.a" while maintaining the version, as follows:

ar-x $ORACLE_HOME/lib/libclient10.a ociClientVer.o

The archive file libclient10.a contains all the object files used to construct a shared library for the end user (e.g.: a large project where the code spans several hundred files one uses the library archive utility to bundle them in a singlefile to be provided to the linker; by doing so one does not need to provide each file to the linker and also takes care of number of character that can be entered in a shell.)

Next, inventory entries now in opatchinv.out (which was generated from "opatch" utility as noted above) are added into the object file (which was generated by the "ar" utility) as follows:

genezi-i ociClientVer.o "." opatchinv.out

Note that the inventory option of genezi utility functions in the same manner as that discussed above (see Appendices A and B) with only the following difference. There is only one file from the directory specified (e.g. in this case "opatchinv.out") that is used to generate a source file in the C language, and contents of the specified file are bundled therein. Next, the newly created ociClientVer.o file is inserted back into the archive file (and replaces its prior version) as follows:

ar-r $ORACLE_HOME/lib/libclient10.a ociClientVer.o rm ociClientVer.o

Thereafter, the shared library (inventory library executable file) is generated as follows:

genclntsh

Note that genclntsh is a shell script that relinks the shared library containing the new objects.

Figure 3:
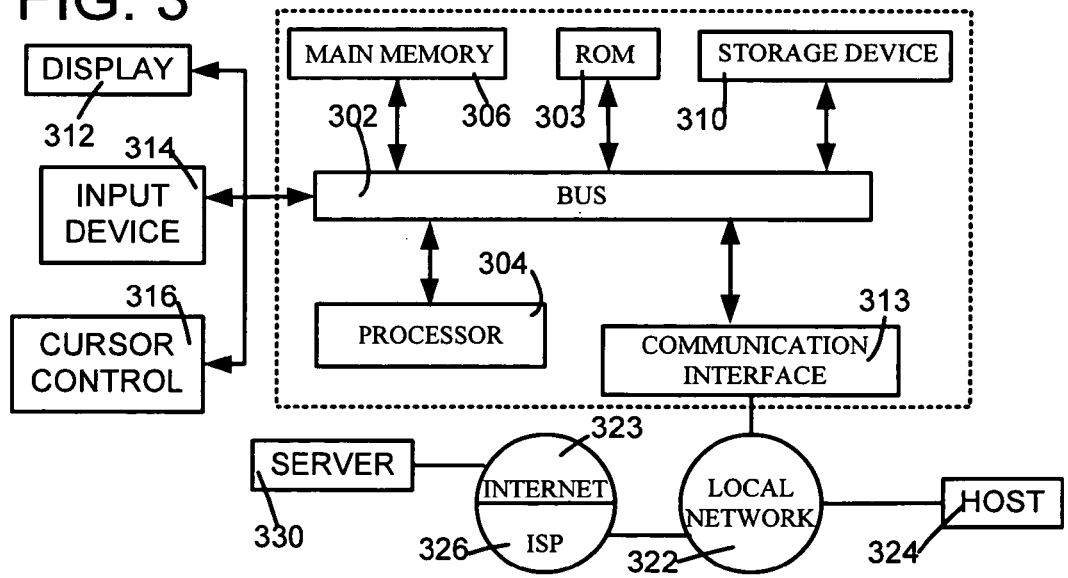
FIG. 3 illustrates, in a high level block diagram, hardware included in a computer that may be used to perform the method of FIG. 2C in some embodiments of the invention. A computer of the type shown in FIG. 3 can also be used as an end user's computer, to receive an installation of the overwritten executable file and the modified application.

Computers 100 and 180 described above can be implemented by hardware that forms a computer system 300 as illustrated in FIG. 3. Specifically, computer system 300 includes a bus 302 (FIG. 3) or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

As described elsewhere herein, product packaging and installation is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. Local network 322 may interconnect multiple computers (as described above). For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network 328 now commonly referred to as the "Internet". Local network 322 and network 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for implementing product packaging and installation of database management systems as described herein.

The received code may be executed by processor 304 as it is received, and/or stored in storage device 310, or other non-volatile storage for later execution. In this manner, computer system 300 may obtain application code in the form of a carrier wave.

Note that some embodiments avoid parsing overhead of file pathnames, by limiting each executable file to storage of read-only data to files accessed only relative to a default directory for the application (e.g. as specified in the environment variable ORACLE_HOME). Again for the same reason, in some embodiments read-only data in each component's directory (or subdirectories thereof) under the default directory are packaged in only one data shared library, i.e. only one executable file. Hence, if each top-level directory in ORACLE_HOME can be considered a component, then a component's files are prohibited from being split across multiple shared libraries. For example, files matching ORACLE_HOME/oracore/mesg/*.msb and ORACLE_HOME/oracore/zoneinfo/*.dat can be packaged in the same shared library because both of these sets of files belong to the same oracore component. Hence, one cannot package oracore/mesg files in one shared library and oracore/zoneinfo files in another shared library.

Moreover, some embodiments package data from several components into a single data shared library. For example, a shared library in an executable file of name "libociei.so" for the OCI Instant Client data, contains read-only data from ORACLE_HOME/rdbms/mesg/*.msb, ORACLE_HOME/oracore/mesg/*.msb, ORACLE_HOME/oracore/zoneinfo/*.dat, and ORACLE_HOME/nls/data/*.nlb. Hence this is an illustration wherein a single executable file "libociei.so" contains data from the following multiple components: rdbms, oracore, and the nls.

Numerous modifications and adaptations of the embodiments described herein will be apparent to the skilled artisan in view of the disclosure. For example, although in some embodiments the acts of FIG. 2C are performed automatically by a programmed computer, in other embodiments one or more of such acts are performed by the computer under manual direction (by a human).

Although in some embodiments a single executable file 240 is used as described above, in other embodiments the above described file address and/or file size and/or file name are stored in one (or more) file(s) that are in addition to the executable file (in which the above-described file data is stored). For example, the virtual directory 241 may be stored in a different file altogether. As another example file names list 242 may also be stored in the different file containing the virtual directory or in yet another different file. The just-described different files may each be a simple data file or another executable file of the type described above. Alternatively, each file name may be stored adjacent to where-ever the data for each file is written (either preceding such data or following such data), although such storage is likely to cause the pages containing each file name to be loaded in memory during a search to locate the file.

Furthermore, although in some embodiments, the data of all to-be-packaged files 120A of one or more components is placed into a single array in a single executable file 140A, in other embodiments such files 120 are grouped into two or more subgroups, and data from each subgroup of files is then stored in its own executable file 140A, thereby resulting in as many executable files 140A (for a given component) as there are subgroups.

Some embodiments use a predetermined criterion such as a sub-directory name or a file extension to enable an application vendor or an intermediary to identify (and hence select) each group of files that are to be packaged in a corresponding executable file. In such embodiments, the virtual file system, LFV, described above is enhanced to handle multiple executables as follows. In one embodiment, a selected file path prefix (such as ORACLE_HOME/rdbms) of the to-be-packaged files, and a corresponding executable file (which is to contain files in the file path prefix) is registered to (by identification to a function in) the virtual files system LFV. In many such embodiments, the prefix and the executable name are stored in a hash table.

In the just-described embodiments that create multiple executable files, any subsequent file open request to the virtual file system by invocation of a function such as lfvopen parses the full file path (identified in the request) and locates from among several executables in the hash table, one executable file that matches the registered file path prefix. For example, all files belonging to ORACLE_HOME/rdbms can be packaged in an executable file of the name librdbms.so. Then invocation of the function lfvopen in the virtual file system with ORACLE_HOME/rdbms/mesg/english.msb as the argument uses the hash table to return a file buffer in the librdbms.so executable file.

Although some implementations of the correspondence being made between partial file paths and executable file names use a hash table, other implementations can use a sorted array with two fields in each element of the array (the fields being partial path name and a pointer to a call back routine in the corresponding executable). Moreover, alternative embodiments can use file extensions (suffixes) instead of file path prefix, to be associated with (i.e. correspond to) a matching executable file.

Moreover, although in some embodiments an array is declared in order to generate an executable file that is sufficiently large to hold the files being packaged, in other embodiments such an array may be not declared. Instead, an source file that has a function to access the file data is first created and this source file does not have (i.e. is devoid of) any statement declaring the array. After the executable file is created, that executable file is extended beyond its end to accommodate the file data and related information (e.g. virtual directory and file names list) and the size of this information being added is stored at a predetermined location relative to the new end of file (e.g. immediately there-before). For more information on extending an executable file, see the article entitled "Writing custom data to executable files in Windows and Linux" by Daniel Polistchuck available on the Internet at community.borland.com/article/0,1410,27979,00.html. This article is incorporated by reference herein in its entirety.

Also, storage and use of the file size field in the virtual directory may be avoided in some embodiments, e.g. if a special bit pattern (e.g. one or more EOF characters) is used to denote where each file's data ends in the executable file. Moreover, in some embodiments, other information may also be stored in executable file 240, e.g. a version number of the executable file is itself stored in one embodiment, e.g. between the marker and the virtual directory.

Some embodiments do not use an executable file as a shared library, and instead the executable file (which contains read-only data) is linked with the code file (which contains software instructions) of a component so that a single binary image is generated for the component. Such use of the executable file makes the component self-sufficient, eliminating the need to invoke the operating system whenever read-only data needs to be accessed. Although the file size of such a component may be large, due to presence of the entire read-only data that may be needed by the component, such a file resides on disk and read-only data is loaded into memory on an as-needed basis, one page at a time in the normal manner, by the operating system. In several such embodiments, the above-described use of an index is maintained unchanged in such a binary image for the component which includes the read-only data, whereas other embodiments eliminate initialization and use of an index because no checking is needed when the read-only data of a component is known to be locally present within the binary image which also contains the software instructions for the component.

In some embodiments, instead of packaging read-only data files into a data shared library which is separate from the file(s) containing software instructions, the read-only data files are packaged directly into the code shared library of the component. Also for statically linked applications which do not use a shared library, the data files are packaged into the ".a" file of the component. Also, some embodiments provide a facility to third party clients of OCI component to package their read-only data files into a data or code shared library or statically linked executable. See FIG. 1A and the related description above.

Many embodiments use multiple data shared libraries (i.e. multiple executables) to facilitate development and integration of shared libraries across and within organizations. In some embodiments, LPM implements a limit of 100 packages (i.e. executable files for data shared libraries). In such embodiments, OCI reserves 5 packages for its dynamic user callbacks and reserves 15 packages for future enhancements, and so LFV only allows registration of up to a maximum of 80 libraries in the index (e.g. hash table or linked list) of a single application.

Dynamic User Callbacks described in the previous paragraph is a feature of OCI that allows user-created code shared libraries to be loaded at OCI Initialization time to register callbacks for OCI function calls. This feature also uses the Load Program Module (LPM) described above. Hence the limitation of 80 shared libraries (packages).

Some embodiments use the utility genezi with the following functionality. In addition to creating an LPM-loadable data shared library, the genezi utility supports packaging read-only data files in an object file that can be linked into either the code library of the component or a statically linked executable using the component. The genezi utility supports listing of all the data files in a (code or data) shared library or executable file. The genezi utility extracts an individual file's data from the packaged data files in the executable file, which is useful for retrieving patching/maintenance information. Moreover, the just-described genezi functions are made accessible to third party libraries and executables.

In some embodiments, a data shared library is regenerated in an ORACLE_HOME directory of the application vendor and/or OEM. However, in other embodiments, the end user's computer has a compiler and linker available, and the end user's computer actually compiles and links the .c file generated by genezi.

In some embodiments, the directory ORACLE_HOME/lib appears on the Library Path, and ORACLE_HOME/lib is located after the directory which contains the executable files (e.g. the executable files are kept in ORACLE_HOME). Moreover, the components which use executable files have version numbers newer or at the same level as the versions of the components that use individual read-only files in the component's subdirectory under ORACLE_HOME. Such configuration of the directories and files has the effect of invoking components that use executable files (if present), but rest of the components operate from their ORACLE_HOME subdirectories in the normal manner.

Some embodiments of initialization instructions 156 (such as the function "lfvini") keep the status indicator flag of a component in global shared memory of the application (such as LFV global), and usage of a data shared library to access read-only data is made transparent to the component. In some such embodiments, the component's file I/O routine queries LFV global using the function "lfvtype" to find out if the function "lfvopen" needs to be used, while in other embodiments the components use a low level file I/O layer and it is the low level file I/O layer which is changed to use the data shared library transparently. Please note that for new code, application can simply use lfv for both regular and virtual file I/O.

In a first variation of the just-described embodiments, initialization instructions 156 simply return a component data library handle to its caller. This handle is a handle to the package returned by LPM. That is, this is the context by which the entry point (<component>BufferCallback) can be invoked, to get data from the package. If this handle is not NULL, then this component library handle is used with the file opening function "lfvopen" to open the file etc. While architecturally elegant, this approach makes all components very much aware of their use of executable files to hold read-only data. That is, the components of such embodiments keep track of the component data library handle and pass it to the lowest level file I/O routine. Such embodiments require code changes in components that use shared data libraries.

The second variation of the just-described embodiments makes LFV general enough that any default directory rather than ORACLE_HOME can be used. In this case, the definition of a component is not based on the environment variable ORACLE_HOME. Hence, any directory path can be registered in the index as the "home" of a component that matches a given library name. In these embodiments the function "lfvopen" parses the full path name to match any portion thereof with any of the registered "homes" and in case of a match, identifies the appropriate data shared library. In these embodiments, the parsing overhead has a slight performance impact, to support the flexibility.

So while the components are ORACLE_HOME based, the LFV Directory interface for third party executables allows a generic directory to be used as a HOME, but then it cannot use the full pathname based lfvopen. The directory-based approach has to use lfvinid to get a directory handle and then open files using lfvopend in the context of the directory handle.

Accordingly numerous such modifications and adaptations are encompassed by the attached claims.

Note that Appendix D below illustrates, in pseudo-code form, an example of a source file 110A described above, in reference to FIG. 1B.

APPENDIX A

```
typedef unsigned int ub4;              // typedef for unsigned four byte integer
typedef unsigned char oratext;         // typedef for character strings
struct slfstream;                      // abstract type of OS dependent file handle
#define LFV_MAX_PATH_SIZE              max size of a file path and name
#define GENEZI_MAXFILES                max number of files that can be packaged
#define GENEZI_PATTERN {some unique pattern}
#define GENEZI_PATLEN length of pattern
typedef struct geneziFR                // structure of file header information
{
   ub4 offset_geneziFR;                // offset for file data
   ub4 name_geneziFR;                  // offset for name
   ub4 size_geneziFR;                  // size of file
   ub4 attrib_geneziFR;                // attribute of file
} geneziFR;
//called with list of dirs and extensions
int genezicreate(char *dirList, char *extList)
{
ub4        i;
slfstream  *fp;                        // file pointer
oratext fnames[LFV_MAX_PATH_SIZE][GENEZI_MAXFILES];
                                       // array to store names
ub4        fsizes[GENEZI_MAXFILES];    // array to store sizes
```

APPENDIX A-continued

```
ub4         nfiles = 0;                 // number of files
ub4         nameBytes = 0;              // number of bytes in all the names
ub4         fileBytes = 0;              // number of bytes for all file data
ub4         headerBytes;                // number of bytes for header info
ub4         memSize;                    // number of bytes for ocieiFileBuffer
ub4         arraySize;                  // array size for ocieiFileBuffer
for (all files with the specified extensions in the directory lists) {
            fnames[nfiles] = copy file name into fnames;
            fp = open(fnames[nfiles] for reading);
            seek_to_end(fp);
            fsizes[nfiles] = get_current_file_position(fp);
            close(fp);
            nfiles++;
}
for (i = 0; i < nfiles; i++) {
            nameBytes += strlen(fnames[i]) + 1;     // add all name lengths
            fileBytes += (fsizes[i] + sizeof(geneziFR) −1)/sizeof(geneziFR);
                        // add all file sizes, rounding them up to the
sizeof(geneziFR)
}
headerBytes = (nfiles + 2) * sizeof(geneziFR);     // 2 records for pattern and
version
memSize = headerBytes + nameBytes + fileBytes      // add storage for all items
arraySize = memSize/sizeof(geneziFR);              // as ocieiFileBuffer is an array of
geneziFR's
print out ociei.c with OCIEI_ARR_SIZE defined to be arraySize and
ocieiFileBuffer defined as:
            static const geneziFR ocieiFileBuffer[OCIEI_ARR_SIZE] =
            OCIEI_PATTERN;
}
```

APPENDIX B

```
// called with shared library name, dir list, and extension list
int genezistore(char *shlib, char *dirList, char *extList)
{
oratext         fnames[LFV_MAX_PATH_SIZE][GENEZI_MAXFILES];
                            // array to store names
geneziFR        frecs[GENEZI_MAXFILES];// header array of file info
ub4             base ;                  // base offset
ub4             nfiles;                 // number of files
for (all files with the specified extensions in the directory lists)
            store filename in the fnames array and set nfiles to number of files;
sort fnames for binary search;
base = locate pattern in shared library shlib;
zero out frecs;
write sorted frames in shlib at base + (1 + sizeof(geneziFR))*nfiles;
for all files in fnames
            write their data in shlib and store their data and name offsets in frecs;
write frecs at base after the pattern;
}
```

APPENDIX C

```
typedef unsigned char ub1;              // typedef for unsigned one byte integer
typedef unsigned int ub4;               // typedef for unsigned four byte integer on
                                        // 32-bit machines
    struct lslpd;                       // handle to call functions in a shared library
    #define LFV_UNKNOWN                 // file system in unknown mode
    #define LFV_DEFAULT                 // file system in default mode
    #define LFV_SHL_MODE                // file system in shared library mode
    typedef ub1 *(*lfvCallback) (char *filename, int *filesize); // callback typedef
    The packages (shared libraries) and components (directory names in
    ORACLE_HOME) use the following data structures to store package and
    component information:
    typedef struct lfvtli    {                     // LFV Text List Item
            char            key_lfvtli[LFV_MAX_PATH_SIZE];       // unique text key
            struct lfvtli   *next_lfvtli;                        // next item in the list
    };
    typedef struct lfvcd { // LFV Component (or package) Descriptor
        lfvtli   lhdr_lfvcd;            // list information
        ub1      type_lfvcd:            // LFV type (mode)
        lslpd    *pkgCtx_lfvcd;         // context for LPM package
```

APPENDIX C-continued

```
    lfvCallback    callback_lfvcd;    // callback into package to get data
    char   pkgname_lfvcd{LFV_MAX_PATH_SIZE}; // package name
};
```
The virtual file system LFV layer maintains a global variable lfvgbl. The flag
maintains state information. The cmptl and pkgtl link lists maintain the link lists
of component and package descriptors. The ORACLE_HOME values is used to
match and remove the ORACLE_HOME prefix passed to file names in lfvopen.
The lfvgbl global is defined as.
```
typedef struct lfvg {
    ub4    flag_lfvg;              // state flag
    lfvtli  *cmptl_lfvg;           // component link list
    lfvtli  *pkgtl_lfvg;           // package link list
    char   home_lfvg[LFV_MAX_PATH_SIZE];   // ORACLE_HOME
    ub4    homel_lfvg;             // length of ORACLE_HOME
};
```
The LFV layer is initialized by calling lfvini. This routine called with the virtual file
system type, component name, and share library name. The callback descriptor is used to
call the callback routine (such as ocieiGetFileBuffer( )) in the shared library. The pseudo
code below assumes that ORACLE_HOME and lfvgbl.cmptl_lfvg and lfvgbl.pkgtl_lfvg
data structures are appropriately initialized.
```
    lfvini (ub1 vfstype, char *component, char *package){
         search component descriptor in lfvgbl.cmptl_lfvg;
         if (component found)
                 return;          // already initialized, nothing to do
         lfvcd *cmpdsc = malloc(sizeof(lfvcd)); // component descriptor
         pkgdsc = search package in lfvgbl.pkgtl_lfvg;
         if (package not found) {
                 try to load package using LPM;
                 if (package could not be loaded) {
                         cmpdsc->type_lfvcd = LFV_DEFAULT; // regular I/O
                         insert compdsc in lfvgbl.cmptl_lfvg;
                         return;
                 }
                 lfvcd *pkgdsc = malloc(sizeof(lfvcd)); // package descriptor
                 pkgdsc->pkgCtx_lfvcd = package context from LPM;
                 pkgdsc->callback_lfvcd = callback to function that returns
                                          data pointer to data in the shared
                                          library
                 pkgdsc->pkgname_lfvcd = package; // package name
                 pkgdsc->type_lfvcd = LFV_SHL_MODE; // SHL mode
                 store pkgdsc in lfvgbl.pkgtl_lfvg;
         }
         cmpdsc->pkgCtx_lfvcd = pkgdsc->pkgCtx_lfvcd;
         cmpdsc->callback_lfvcd = pkgdsc->callback_lfvcd;
         cmpdsc->type_lfvcd = pkgdsc_type_lfvcd; // shared library mode
         insert compdsc in lfvgbl.cmptl_lfvg;
         return;
    }
```
All file I/O routines call lfvtyp to see if operating in the LFV_SHL_MODE
mode. If so, the corresponding LFV file I/O routine should be called. That is, if
lfvtyp returns LFV_SHL_MODE, then the data shared library is successfully
loaded, and the file system for the component is operating in the shared library
mode.
The lfvtyp function is defined as:
```
ub1 lfvtyp(const char *fname) {
    component = extract component from fname;
    cmpdsc = search component descriptor in lfvgbl.cmptl_lfvg;
    if (component not found)
            return LFV_UNKNOWN;
    else
            return cmpdsc->type_lfvcd;
}
```
File handles in the LFV layer have the following structure:
```
typedef struct lfvf {
    ub1    *buf_lfvf;     // pointer to data buffer
    ub4    size_lfvf;     // size of the file
    ub1    pos_lfvf;      // current offset in the buffer
}
```
A file is opened with the lfvopen routine described below:
```
                                       // returns a valid file handle if successful
                                       // returns a NULL handle is returned if error
lfvf *lfvopen(const char *fname) {
    if (fname does not begin with lfvgbl.ohome_lfvg)
            return (lfvf *) NULL;
    char *relativeFileName = fname + lfvgbl.ohomel_lfvg;
                              // file path relative to ORACLE_HOME
    ub4 fsize;              // file size
    ub1 *buf;               // pointer to data of the file
    char *component;        // component name
    lfvcd *cmpdsc;          // component descriptor
```

APPENDIX C-continued

```
        component = extract component from fname;
        cmpdsc = search component descriptor in lfvgbl.cmptl_lfvg;
        if (component not found)
                return (lfvf *)NULL;
        buf = cmpdsc->callback_lfvcd(relativeFileName, &fsize);
        if (!buf)
                return (lfvf *)NULL;
        lfvf *fhandle = allocate(sizeof(lfvf));
        fhandle->buf_lfvf = buf;
        fhandle->size_lfvf = fsize;
        fhandle->pos_lfvf = 0;
        return fhandle;
}
A file is closed by calling lfvclose routine described below:
lfvclose(lfvf *fhandle) {
        free(fhandle);
}
Data is read from the file by calling lfvread function described below. This function
returns number of bytes or negative error code
        sb4 lfvread(lfvf *fhandle, ub1 *buf, ub4 nbytes){
                ub4 bytesToRead = min(nbytes, fhandle->size_lfvf- >fhandle->pos_lfvf);
                if (!bytesToRead)
                        return end of file;
                memcpy(buf, fhandle->buf_lfvf + pos_lfvf, bytesToRead);
                fhandle->pos_lfvf += bytesToRead;
                return bytesToRead;
}
A seek operation is performed by calling lfvseek function described below:
lfvseek(lfvf *fhandle, ub4 offset, ub1 whence, ub4 flag);{
        if (whence == SEEK_SET)
                fhandle->pos_lfvf = offset;
        else if (whence == SEEK_CUR)
                fhandle->pos_lfvf += offset;
}
For a hash table implementation, the cmptl_lfvg and pkgtl_lfvg link lists will be
replaced by Hash Tables. The component and package descriptors will be
inserted and retrieved from these hash tables for the insert and search operation
for components and packages.
```

APPENDIX D

```
typedef unsigned char ub1;            // typedef for unsigned one byte integer
#define GENEZI_PATTERN {0x00010203, 0x04050607, 0x08090a0b,
0x0c0d0e0f}
#define GENEZI_PATLEN 16
typedef struct geneziFR{
   ub4 offset_geneziFR;
   ub4 name_geneziFR;
   ub4 size_geneziFR;
   ub4 attrib_geneziFR;
} geneziFR;
#define ociei_NUMFILES 1894
#define ociei_ARRSIZE 21144782 /* totalBytes = 84579128 */
static const ub4 ocieiFileBuffer[ociei_ARRSIZE] = GENEZI_PATTERN;
static const ub1 *ocieiSrcOff = (oratext *)(ocieiFileBuffer) + GENEZI_PATLEN;
static sword ocieiNameCompare(const void *fname, const void *frec) {
  oratext *rec_fname = (oratext *)ocieiSrcOff +
                                    ((geneziFR *)frec)->name_geneziFR;
  return strcmp((const char *)fname, (const char *)rec_fname);
}
const ub1 *ocieiGetFileBuffer(oratext *fname, ub4 *fsize){
   geneziFR *frec = (geneziFR *)bsearch(fname, ocieiSrcOff, ociei_NUMFILES,
                    sizeof(*frec), ocieiNameCompare);
   if (frec) {
       if (fsize)
              *fsize = frec->size_geneziFR;
       return(ocieiSrcOff + frec->offset_geneziFR);
   }
   return((ub1 *)0);
}
```

What is claimed is:

1. A method of packaging multiple groups of read-only files, the method comprising:
   preparing a plurality of executable files by use of at least one processor, each executable file corresponding to a group of read-only files, each executable file comprising an array, the array having been declared in a source file corresponding to said each executable file, to have a size based at least on (A) total size of data in the group of read-only files corresponding to said each executable file and (B) a size of a name of each read-only file in the group;
   overwriting the array in said each executable file with data from the group of read-only files corresponding to said each executable file; and
   adding, to an application program, a plurality of instructions to set up an index in a computer that is to execute said application program, when set up said index to be indicative of presence or absence of said each executable file in said computer.

2. The method of claim 1 wherein:
   the index comprises a hash table in a memory of said computer.

3. The method of claim 1 wherein:
   the index comprises a linked list in a memory of said computer.

4. The method of claim 1 wherein:
   the application program comprises a function to use the index to return a file pointer to a location within an executable file in the plurality of executable files, of data previously stored for a read-only file, said read-only file being identified to said function by name.

5. The method of claim 1 wherein:
   the application program comprises instructions to check if the index indicates presence and if so invoking a function that uses an executable file to access said data previously stored therein from said read-only file and otherwise said application program invoking an operating system function to open said read-only file.

6. The method of claim 1 further comprising:
   prior to said overwriting, scanning each executable file for a marker identical to all executable files in said plurality of executable files;
   wherein the overwriting is performed relative to the marker in said each executable file.

7. The method of claim 1 wherein:
   the application program comprises a plurality of components;
   at least one executable file contains data of a number of read-only files of a corresponding number of components in said application program; and
   at least another executable file contains data of a read-only file of only one component in said application program.

8. The method of claim 1 wherein:
   the name of each group of read-only files identifies a subdirectory under a home directory for the application program.

9. A non-transitory computer-readable medium storing one or more sequences of instructions executable by at least one processor, the one or more sequences of instructions comprising:
   a first plurality of instructions to automatically prepare a plurality of executable files, each executable file corresponding to a group of read-only files, each executable file comprising an array, the array having been declared in a source file corresponding to said each executable file, to have a size based at least on (A) total size of data in the group of read-only files corresponding to said each executable file and (B) a size of a name of each read-only file in the group;
   a second plurality of instructions to automatically overwrite the array in said each executable file with at least information from the group of read-only files corresponding to said each executable file; and
   an application program comprising a third plurality of instructions to set up an index indicative of presence or absence of said each executable file, in a computer executing said application program.

10. An apparatus for packaging multiple groups of read-only files, the apparatus comprising:
    means for automatically preparing a plurality of executable files, each executable file corresponding to a group of read-only files, each executable file comprising an array, the array having sufficient space to accommodate at least the group of read-only files corresponding to said each executable file;
    means for automatically overwriting the array in said each executable file with (a) data from the group of read-only files corresponding to said each executable file and (b) additional information comprising (i) names of the read-only files and (ii) offsets of where the data from the read-only files begin in said each executable file; and
    a memory having stored therein an application program comprising a plurality of instructions to set up an index indicative of presence or absence of said each executable file, in a computer executing said application program.

11. The non-transitory computer-readable medium of claim 9 wherein:
    the application program further comprises a fourth plurality of instructions to use the index to return a file pointer to a location within an executable file in the plurality of executable files, of data previously stored for a read-only file, said read-only file being identified by name.

12. The non-transitory computer-readable medium of claim 9 wherein:
    the application program further comprises a fourth plurality of instructions to check if the index indicates presence and if so invoking a function in the application program and otherwise invoking an operating system function to open said read-only file.

13. The non-transitory computer-readable medium of claim 9 wherein:
    each executable file includes a predetermined bit pattern identical to all executable files in said plurality of executable files; and
    the array is located at a predetermined offset relative to the predetermined bit pattern.

14. The apparatus of claim 10 wherein:
    the application program further comprises additional instructions to use the index to return a file pointer to a location within an executable file in the plurality of executable files, of data previously stored for a read-only file, said read-only file being identified by name.

15. The apparatus of claim 10 wherein:
    the application program further comprises additional instructions to check if the index indicates presence and if so invoking a function in the application program and otherwise invoking an operating system function to open a read-only file.

16. The apparatus of claim 10 wherein:
    each executable file includes a predetermined bit pattern identical to all executable files in said plurality of executable files; and the array is located at a predetermined offset relative to the predetermined bit pattern.

17. The method of claim 1 wherein:

each executable file includes a header; and the overwriting is performed by use of least one processor based on a location, identified by use of information in said header, of said array.

18. The method of claim 1 further comprising:

instructing an operating system in said computer to treat said plurality of executable files as shared libraries.

19. The method of claim 1 wherein:

said second plurality of instructions comprise a function that returns a simulated EOF when all data from said read-only file has been read.

20. A method of packaging multiple groups of read-only files, the method comprising:

preparing a plurality of executable files by use of at least one processor, each executable file corresponding to a group of read-only files, each executable file comprising an array, the array having sufficient space to accommodate at least the group of read-only files corresponding to said each executable file;

overwriting the array in said each executable file with (a) data from the group of read-only files corresponding to said each executable file and (b) additional information comprising (i) names of the read-only files, and (ii) offsets of where the data from the read-only files begin in said each executable file; and adding, to an application program, a plurality of instructions, to set up an index indicative of presence or absence of said each executable file in a computer executing said application program.

21. The method of claim 20 wherein:

the application program further comprises additional instructions to use the index to return a file pointer to a location within an executable file in the plurality of executable files, of data previously stored for a read-only file, said read-only file being identified by name.

22. The method of claim 20 wherein:

the application program further comprises additional instructions to check if the index indicates presence and if so invoking a function in the application program and otherwise invoking an operating system function to open said read-only file.

23. The method of claim 20 wherein:

each executable file includes a predetermined bit pattern identical to all executable files in said plurality of executable files; and the array is located at a predetermined offset relative to the predetermined bit pattern.

24. A non-transitory computer-readable medium storing one or more sequences of instructions executable by at least one processor, the one or more sequences of instructions comprising:

a first plurality of instructions to prepare a plurality of executable files, each executable file corresponding to a group of read-only files, each executable file comprising an array, the array having sufficient space to accommodate at least the group of read-only files corresponding to said each executable file;

a second plurality of instructions to overwrite the array in said each executable file with (a) data from the group of read-only files corresponding to said each executable file and (b) additional information comprising (i) names of the read-only files and (ii) offsets of where the data from the read-only files begin in said each executable file; and an application program comprising a third plurality of instructions to set up an index indicative of presence or absence of said each executable file, in a computer executing said application program.

25. The non-transitory computer-readable medium of claim 24 wherein:

the application program further comprises additional instructions to use the index to return a file pointer to a location within an executable file in the plurality of executable files, of data previously stored for a read-only file, said read-only file being identified by name.

26. The non-transitory computer-readable medium of claim 24 wherein:

the application program further comprises additional instructions to check if the index indicates presence and if so invoking a function in the application program and otherwise invoking an operating system function to open a read-only file.

27. The non-transitory computer-readable medium of claim 24 wherein:

each executable file includes a predetermined bit pattern identical to all executable files in said plurality of executable files; and the array is located at a predetermined offset relative to the predetermined bit pattern.

28. An apparatus to package multiple groups of read-only files, the apparatus comprising at least one processor and one memory and further comprising:

means for preparing a plurality of executable files, each executable file corresponding to a group of read-only files, each executable file comprising an array, the array having been declared in a source file corresponding to said each executable file, to have a size based at least on (A) total size of data in the group of read-only files corresponding to said each executable file and (B) a size of a name of each read-only file in the group;

means for overwriting the array in said each executable file with data from the group of read-only files corresponding to said each executable file; and means for adding, to an application program, a plurality of instructions to set up an index in a computer that is to execute said application program, when set up said index to be indicative of presence or absence of said each executable file in said computer.

* * * * *

UNITED STATES PATENT AND TRADEMARK OFFICE
CERTIFICATE OF CORRECTION

PATENT NO. : 8,522,205 B2  
APPLICATION NO. : 11/437899  
DATED : August 27, 2013  
INVENTOR(S) : Lari et al.

Page 1 of 1

It is certified that error appears in the above-identified patent and that said Letters Patent is hereby corrected as shown below:

In the Specification

In column 1, line 34, delete "C:Program" and insert -- C:\Program --, therefor.

In column 10, line 50, delete "share-able" and insert -- shareable --, therefor.

In column 13, line 14, delete "computerl 80" and insert -- computer 180 --, therefor.

In column 15, line 60, delete "nis" and insert -- nls --, therefor.

In column 17, line 15, delete "1201" and insert -- 120I --, therefor.

In column 25-26, line 14, delete "frames" and insert -- fnames --, therefor.

Signed and Sealed this  
Thirty-first Day of December, 2013

Margaret A. Focarino  
*Commissioner for Patents of the United States Patent and Trademark Office*